April 25, 1950 — W. H. RYAN — 2,505,146
PROCESS AND APPARATUS FOR STRETCHING
CONTINUOUS SHEET MATERIALS
Filed Dec. 14, 1946 — 9 Sheets-Sheet 4

INVENTOR
William H. Ryan
BY Donald C. Brown
and Moncure B. Berg
Attorneys

April 25, 1950  W. H. RYAN  2,505,146
PROCESS AND APPARATUS FOR STRETCHING
CONTINUOUS SHEET MATERIALS
Filed Dec. 14, 1946  9 Sheets-Sheet 5
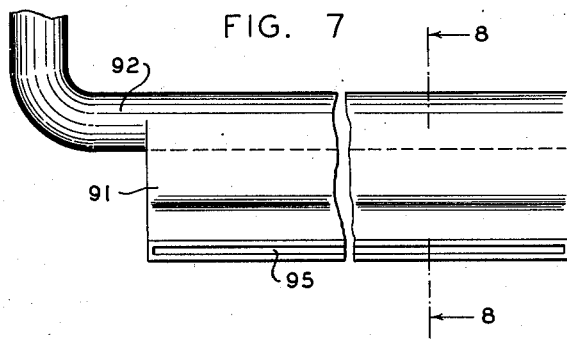
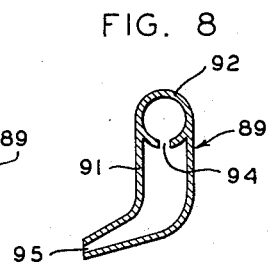
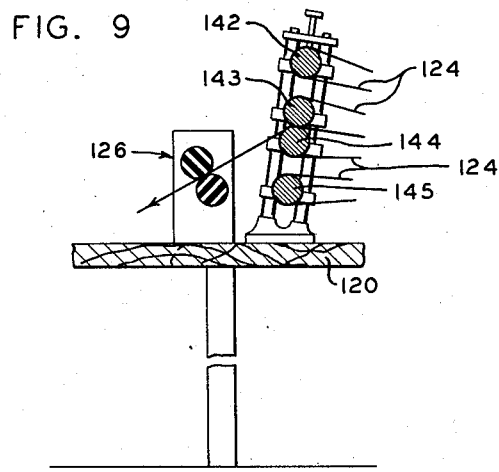
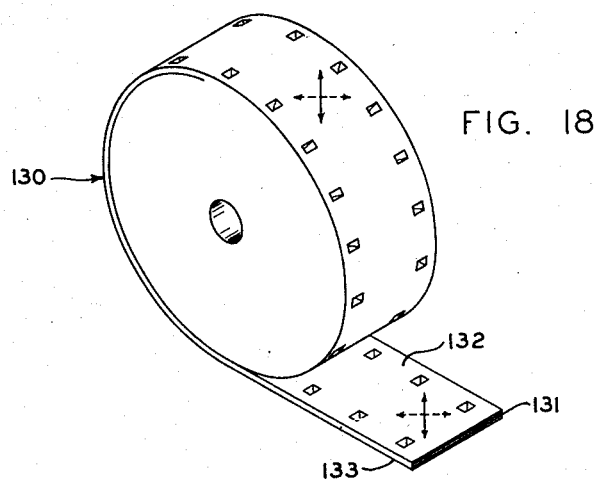
INVENTOR
William H. Ryan
BY
Donald L. Brown
and
Moncure B. Berg
Attorneys April 25, 1950  W. H. RYAN  2,505,146
PROCESS AND APPARATUS FOR STRETCHING
CONTINUOUS SHEET MATERIALS
Filed Dec. 14, 1946  9 Sheets-Sheet 7

$\alpha \neq 90°$ and is variable
$V = 90°$ $\alpha = 90°$
$V \neq 90°$ and is variable $\alpha = V \neq 90°$
$\alpha$ and $V$ are variable INVENTOR
William H. Ryan
BY Donald R. Brown
and Moncure B. Berg
Attorneys Patented Apr. 25, 1950

2,505,146

UNITED STATES PATENT OFFICE 2,505,146

PROCESS AND APPARATUS FOR STRETCHING CONTINUOUS SHEET MATERIALS

William H. Ryan, Cambridge, Mass., assignor to Polaroid Corporation, Cambridge, Mass., a corporation of Delaware Application December 14, 1946, Serial No. 716,308

22 Claims. (Cl. 18—1)

This invention relates to continuous processes and apparatus for stretching continuous sheet materials as well as to products formed in the practice of such processes.

Objects of the invention are to provide novel processes for stretching continuous sheet materials whereby to predeterminedly modify the characteristics and properties thereof and also to provide processes for forming novel products making use of predeterminedly modified, continuous sheet material.

Another object of the invention is to provide a stretching process involving moving continuous sheeting lengthwise of itself along a selected path and at a selected speed and discharging it at a substantially straight line which extends across such path and which lies in a predetermined plane and applying pressure to the sheeting by the application of a frictional force to the surfaces thereof substantially along the discharge line while continuing the lengthwise movement of the sheeting without interruption by drawing it under tension at a second selected speed along a second selected path and against the restraining frictional force applied to the sheeting, the traces of the selected paths when projected into the plane of the discharge line appearing as straight lines which are angularly disposed to the discharge line in such relation that the trace of one path is disposed at angles of other than 90° to the discharge line.

Other objects of the invention are the provision of processes wherein stretching is employed to alter dimensions of sheet materials and to alter the area of sheet materials, as well as in the provision of processes for predeterminedly stretching sheet materials in a direction inclined to the longitudinal edge of such materials and also to predeterminedly orient the molecules of sheet material and especially to orient the molecules of sheet material in a direction angularly disposed to the longitudinal edges thereof.

Yet other objects of the invention are to provide processes of the nature described, wherein the characteristics and properties of sheet materials are modified by controlling the direction of the paths followed by the sheeting and the speeds of movement of the sheeting along such paths during stretch processing; and wherein the sheet material is softened to facilitate its stretching; wherein the softened sheet material is subjected to hardening treatment after stretching and is cut to a predetermined width; and wherein continuous stretched sheet material is laminated or bonded to other continuous sheet material in superposed relation thereto.

Yet further objects of the invention are to provide apparatus and means for stretching continuous sheeting and laminating it to other sheeting whereby to carry out stretching processes of the character described; to provide apparatus for stretching continuous sheeting wherein sheeting is moved along a selected path in a selected direction and wherein the sheeting is placed under tension while continuing its movement along a second selected path at a second selected speed; to provide apparatus of the character described having means engaging and moving continuous sheeting lengthwise of itself along a selected path at a selected speed and discharging it at a straight line which extends across such path and which lies in a predetermined plane, the apparatus having means for applying pressure to said sheeting along said discharge line and also having means engaging the sheeting and continuing the lengthwise movement thereof without interruption by drawing it under tension at a second selected speed along a second selected path and against the force applied thereto at the discharge line, the traces, in the plane of the discharge line, of the paths followed by the sheeting being in predetermined relation to the discharge line and especially in a relation such that at least the trace of one path is disposed to the discharge line at angles of other than 90°; and to provide means in a machine of the character described for changing the direction of the paths followed by sheeting in its movement through the machine as well as to provide means for moving the sheeting at selected speeds along said paths.

Still other objects reside in the provision of stretching apparatus comprising spaced-apart input rolls and output rolls and means associated with said rolls whereby sheet material may be passed therethrough while following paths which are in predetermined angular relation to the axes of the input rolls and the output rolls; to provide, in apparatus of the character described, means for causing sheeting to be fed into and passed through pressed-together rotating rolls while following selected paths lying in predetermined directions, especially driven belt means for causing the moving sheeting to track or follow a predetermined path; and also to provide stretching apparatus having an input section and an output section in at least one of which sections means are employed for moving the sheeting undergoing processing which comprise belt means having two overlying belt surfaces moving in the same direction and gripping opposed surfaces of the sheeting along a substantially straight line extending across the path of movement of the belt means whereby to move the sheeting in accordance with the movement of the belt means.

Also, other objects of the invention are to provide stretching apparatus comprising a single machine of the character described or a plurality of such machines arranged in pairs for successively operating upon continuous sheeting whereby to predeterminedly modify the sheeting; to provide individual machines with means for softening sheeting undergoing processing to facilitate the stretching thereof; and also to provide means adapted to reharden the softened sheeting after stretching as well as means to predeterminedly cut the sheeting.

Other objects of the invention will in part be obvious and will in part appear hereinafter.

The invention accordingly comprises the processes involving the several steps and the relation and the order of one or more of such steps with respect to each of the others, the products produced by said processes and possessing the features, properties and the relation of components, and the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings.

In the drawings, wherein like reference characters refer to like parts throughout the several views:

Fig. 2a is a partial section showing a modification of a portion of the machine illustrated in Figs. 1, 2 and 3;

Fig. 7 is an elevation of a heating duct employed with the apparatus;

Fig. 8 is a section on the line 8—8 of Fig. 7;

Fig. 9 is a vertical section similar to Fig. 2 of a modified portion of stretching apparatus with parts of the machine broken away and omitted;

Fig. 18 illustrates a product of the invention in the form of motion picture film material.

Figure 1:
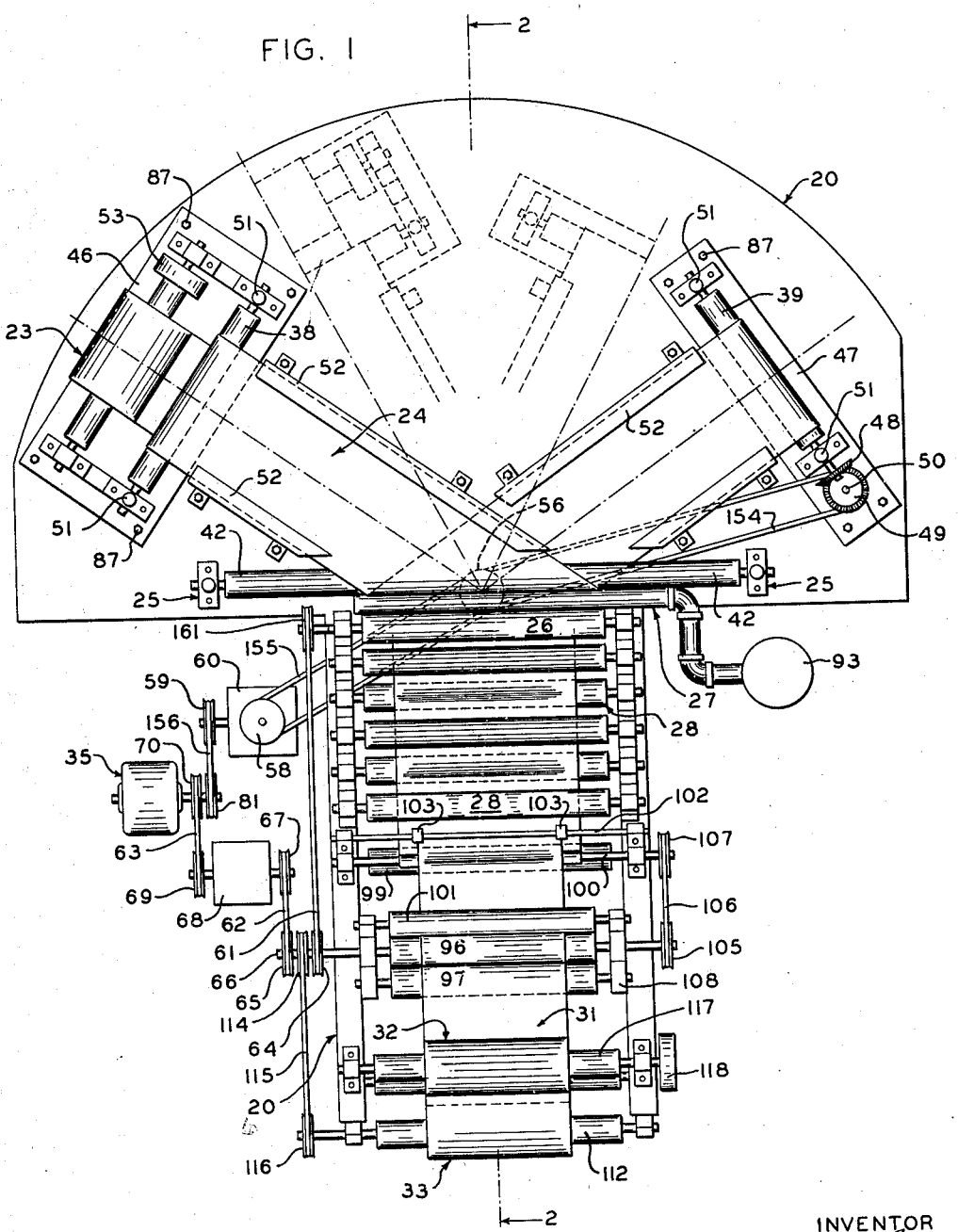
Figure 1 is a plan view illustrating one embodiment of a stretching apparatus or machine.

It is known that the physical characteristics of many solid materials may be changed by stretching such materials. For example, a material may be stretched to increase its tensile strength in a direction parallel to the direction of stretch. A sheet material may be stretched for the purpose of increasing its area or for changing its dimensions as by increasing its length or its width or by decreasing its thickness or its width as well as for the purpose of flattening the sheet. In the case of a plastic sheet, stretching may be employed to orient its molecules or to increase the birefringence of the sheet.

Plastic sheet materials which are hydrophilic as well as those which are substantially nonhydrophilic or are hydrophobic and which have long chain, substantially oriented molecules are useful for numerous purposes. For example, oriented plastic sheet materials may be employed in the formation of a variety of optical elements such as polarizers, filters, spectacle and goggle lenses, wave retardation elements, headlights, windshields, and the like. Also, suitable materials of this character may be used in photography in the formation of a light-polarizing sheet which serves as a support or carrier for a light-sensitive emulsion and in addition transparent, hydrophilic, molecularly oriented plastic material is well adapted for the formation or reproduction therein of light-polarizing images, designs, and the like. In all of these uses, hydrophilic, molecularly oriented material may have one or more dichroic substances, such as a dichroic stain or dye, incorporated throughout the same or only in predetermined portions thereof to render those portions of the material which contain the dichroic stain or dye light-polarizing in character.

For many purposes it has been found more advantageous and convenient to effect an orientation of the molecules of plastic sheeting in some direction other than lengthwise or longitudinally of the sheeting. For example, in the formation of vectographs, a molecular orientation making an angle of 45° to the longitudinal edge of the sheet is desirable. It is also expedient to employ an orientation axis of 45° or of 35° or of 22½° for use in polarizing headlights, these angles being measured from a longitudinal edge of sheeting which is employed for this purpose.

Plastic sheet material having its molecules oriented longitudinally of the sheet, or for that matter oriented laterally of the sheet, may be cut at an angle to the edge of the sheet to provide one or more rectangles having the preferred orientation axes of 45° or 35° or 22½°. However, such practice is wasteful, not only in labor but in loss of materials. When sheet material is cut as just described, only relatively short lengths of a maximum of several feet can be obtained. It is obviously impractical to secure or splice these short pieces together to provide continuous sheeting as, for example, in even 50- or 100-foot lengths suitable for the production of amateur motion picture film, let alone in lengths of 1,000 and 2,000 feet needed in forming 35-mm. motion picture film in standard reel lengths. Furthermore, pieces of sheet material having a molecular orientation at an angle of other than 90° to an edge thereof, at present made available by suitably cutting longitudinally or laterally stretched sheeting, are of insufficient length for automobile windshield work without splicing, a condition which is, of course, undesirable.

The desirability of providing a process and apparatus for stretching continuous plastic sheet material whereby to orient its molecules in a predetermined transverse direction of the sheet or in a direction inclined to the long edge of the sheet at a predetermined angle will be appreciated, especially when the process and apparatus may be employed to control the degree of orientation of the molecules.

To this end the invention contemplates the provision of processes and apparatus for continuously stretching sheet material which involves moving continuous sheeting lengthwise of itself along a selected path at a selected speed towards a straight line which extends across such path and which lies in a predetermined plane, discharging the sheeting across said line while applying a frictional force to the surfaces of the sheeting whereby to exert pressure on the sheeting in a direction substantially perpendicular to its surfaces along the discharge line and continuing the lengthwise movement of the sheeting without interruption by drawing it under tension at a second selected speed along a second selected path and against the restraining frictional force applied along the discharge line.

Stretching to effect orientation in a direction inclined to an edge of the sheeting is so carried out that the traces of the paths along which the sheeting moves, when projected into a plane which contains the discharge line, appear as straight lines which are angularly disposed to the discharge line in such relation that the trace of at least one path is disposed at angles of other than 90° to the discharge line. This plane which contains the discharge line is commonly referred to as the plane of the discharge line. By such procedure the traces of the two paths in the plane of the discharge line are angularly disposed with respect to each other. It is also possible, as will presently appear, to conduct stretching operations in such manner that the second selected path forms a continuation of the first path followed by the sheeting in its movement so that traces of the two paths in the plane of the discharge line form a substantially straight line.

When sheet material is stretch processed in the manner just described, the forces set up in the sheeting as it moves along the just-mentioned paths, at least in the case of plastic materials, effect an orientation of its molecules. The rate of speed at which the sheet material is incoming towards the discharge line and the rate of speed at which it is outgoing from the discharge line, subsequently described as the speed ratio $u$, as well as the angular relation of the paths followed by the sheeting with respect to the discharge line, hereinafter described as the input angle $a$ and the output angle $\gamma$, will determine the angular direction of the orientation of the molecules of the sheeting with respect to a longitudinal edge of the sheet material, hereinafter designated by the angle $\phi$ and called the orientation axis, as well as the degree of orientation of the molecules, hereinafter designated by K and called the axial ratio.

While sheet materials other than plastic sheeting may be treated by the machines and processes set forth herein, operations upon plastic sheeting afford excellent examples for illustrating the invention and the machines and processes thereof will be described primarily in connection with the treatment of plastic sheeting.

Orientation of the molecules of plastic sheet materials occurs as an incident to the stretching of such materials. The terms "molecular orientation," "orientation," "molecularly oriented," and "oriented" as used in the specification and claims with reference to sheet materials, unless otherwise specifically stated, are intended to mean a condition of molecular arrangement in which the long axes of the molecules of the sheeting are aligned substantially in parallel relation with each other and with an axis positioned to lie within the plane which passes through the length and the breadth dimensions of the sheet. It is also possible to orient the molecules of sheet materials so that the long axis of each molecule is substantially parallel to the plane which passes through the length and breadth dimensions of the sheet and whereby the long axes of the molecules are otherwise heterogeneously arranged with respect to each other. This latter type of orientation is known as uniplanar orientation and the same may be obtained by the processes and machines described herein and when so obtained will be specifically indicated.

To carry the invention into effect, use is made of an apparatus or machine having an input section wherein sheet material is continuously fed or moved along a selected path towards an adjoining output section where its movement is continued along a second path while placing the material under tension, the various parts of the machine being supported from the floor. In this arrangement, intersection of the paths followed by the incoming and outgoing sheeting occurs at the junction of the input and output sections.

Figure 2:
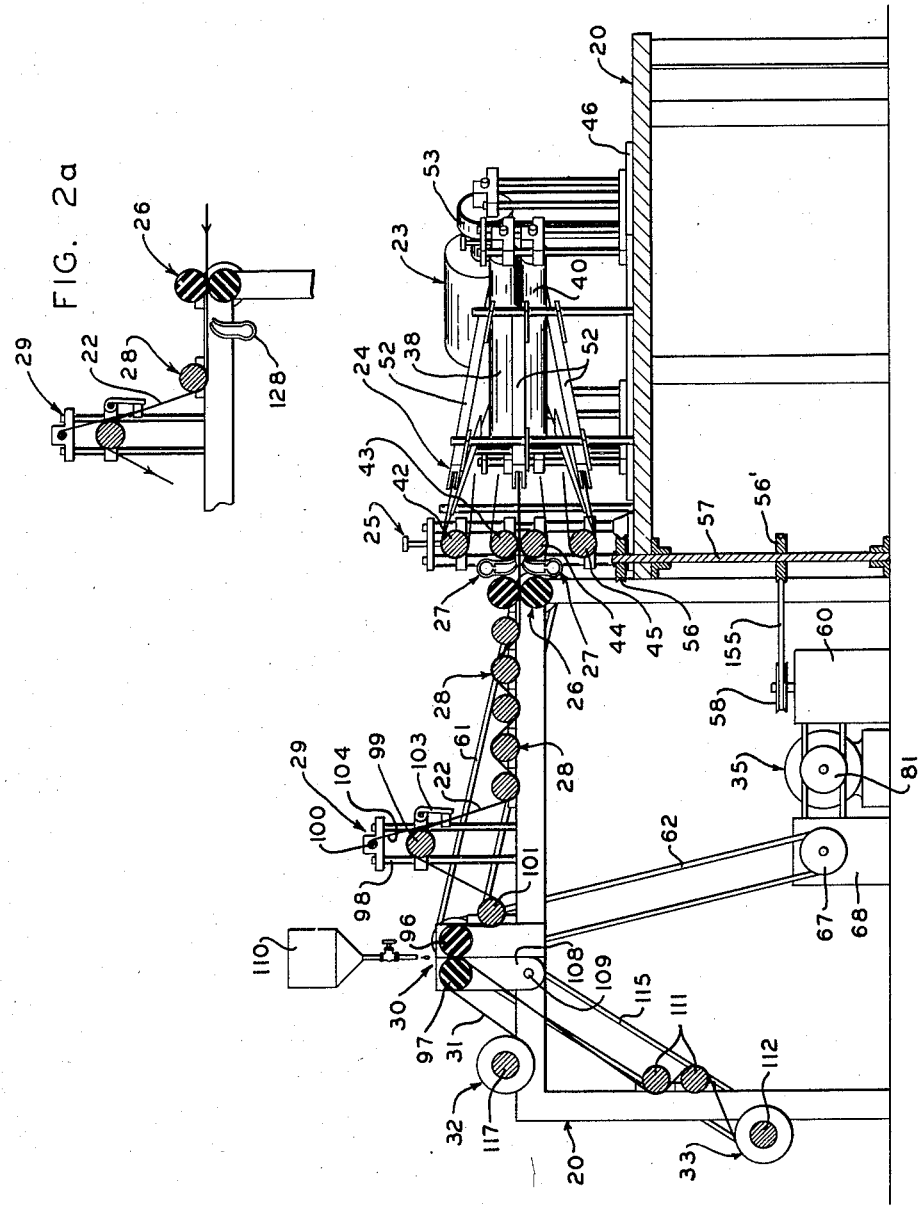
Fig. 2 is a vertical section on the line 2—2 of Fig. 1.
Figure 3:
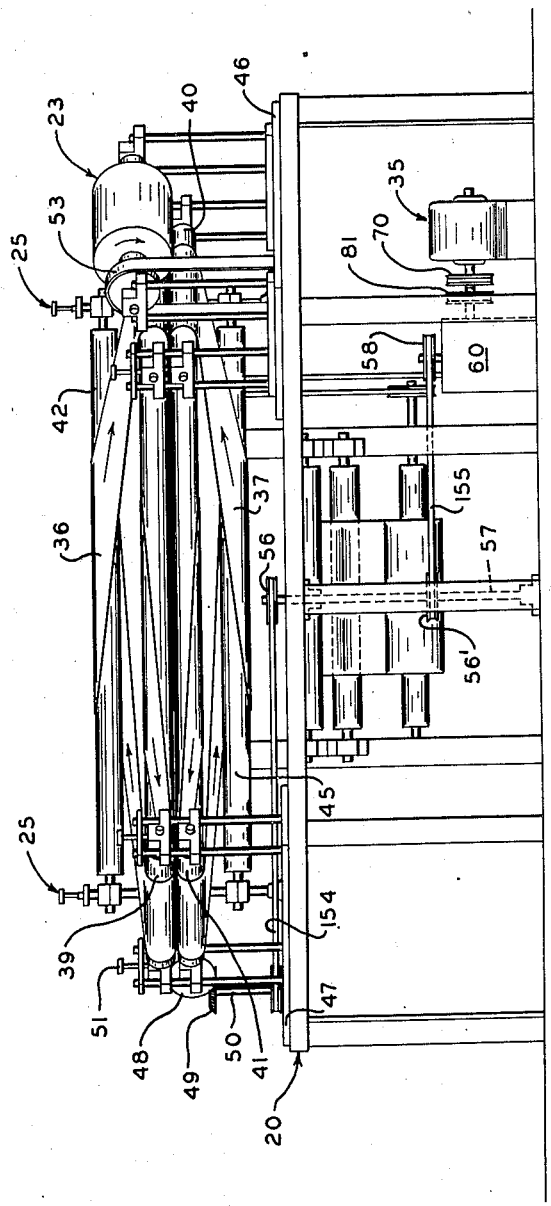
Fig. 3 is an end elevation of the apparatus of Fig. 1 with parts thereof omitted.

One embodiment of such a machine is shown in Figs. 1, 2 and 3 and primary elements thereof comprise aligned input or belt rolls 43 and 44 in conjunction with driven belt means 24 which pass over these rolls and pressure-applying means 25 for pressing the rolls and belt means together, all located in the input section of the machine, and a pair of pressed-together and aligned output rolls 26 located in the output section of the machine and spaced from the input rolls 43. The various parts of the machine are mounted upon a stand or table 20.

Rolls 43 and 44 in conjunction with driven belt means 24 engage sheeting 22 from the stock roll 23 to move the sheeting lengthwise of itself in a predetermined direction with respect to the line of tangency of belt means 24 at the rolls 43 and 44 and effect a continuous discharge of the sheet material at a fixed location along such line of tangency into the output section of the machine. The common ends of the input and output sections may be thought of as determined by the line of tangency between the belt means 24 passing over the rolls 43 and 44.

A more detailed description of the belt means and its function will subsequently appear.

The pressure-applying means 25 permit the belt means 24 and rolls 43 and 44 to apply frictional force to the surfaces of the sheeting in a direction substantially perpendicular to such surfaces along the line of tangency between the belt means going over the rolls 43, 44, which line thus becomes a pressure-applying line extending across the path of the sheeting incoming to the input rolls as well as a line of discharge across which the sheeting is discharged into the output section of the machine. Pressure thus applied is sufficient to allow the sheeting to be drawn under tension as it is discharged from the input section, the rolls 26 in the output section of the machine serving this function while continuing the lengthwise movement of the sheeting without interruption.

While the axes of rolls 26 are disclosed as parallel to the axes of rolls 43 and 44, it will nevertheless be appreciated that the direction of the path along which the sheeting moves from the line of tangency of the belt means 24 to the drawing rolls 26 is angularly disposed with respect to the direction of the path followed by the sheeting in the input section of the machine in Figs. 1, 2 and 3. However, as it will be subsequently pointed out, it is unnecessary for the axes of rolls 26 to be in parallel relation to the axes of rolls 43 and 44.

Other elements of the apparatus located in the output section and which will be later described in detail comprise means 27 for softening the sheeting whereby to increase its ductility, rolls 28 located in a sheet hardening zone and over which the stretched and drawn sheet 22 is moved, means 29 for cutting the sheeting 22 to a predetermined width, laminating means 30 which draw the sheeting 22 together with a second sheeting 31, the latter being carried on a supply roll 32, lengthwise of themselves into contact with each other to laminate the sheeting 31 and 22 together, and if desired reeling or winding means 33 for winding the laminated sheeting 34 into a roll. An electric motor 35, operated by a suitable source of electricity is employed for driving the belt means and the rotating drawing rolls of the machine in a manner to be later described.

Assume a pair of rotating wringer rolls arranged in pressure contact to have their axes of rotation substantially parallel. When sheeting is fed between such a pair of rolls so that a longitudinal edge thereof forms an acute angle which lies outside of the sheet and which is formed between such edge and the line of tangency of the rolls, the sheeting during its passage between the rolls translates with respect to the line of tangency in the general direction of the slope of the acute angle. For example, successive points on the edges of the sheeting will move in a direction perpendicular to the line of tangency rather than along the slope of the acute angle. Thus, each successive point on an edge of the sheeting will cross the line of tangency at a different point on such line rather than at the same point. A similar condition exists for any point in the sheet which is not on an edge thereof. To an observer, this condition makes it appear that the sheeting as it passes between the rolls moves across them.

The just-described condition must be overcome if stretching operations of the character contemplated by this invention are to be successfully and practicably obtained. An answer to this problem is to cause the output or discharge of the rolls to always occur at a fixed location or along a predetermined portion of the line of tangency of the rolls. Discharge at a fixed location is possible if a force is introduced to act upon the sheeting in a direction at 90° to the force exerted by the pull of the rolls whereby to effect "tracking" of the sheeting, tracking being defined as causing the sheeting as it enters and as it is discharged from the rolls to follow a path which is predeterminedly positioned and inclined to the line of tangency of the rolls. Any way of causing sheeting to track falls within the concept of this invention.

A very satisfactory manner of causing the sheeting to track in its movement as effected by two rotating rolls is to employ endless driven belt means comprising an individual belt engaged with each roll. In making use of this expedient, the belts are wrapped around the rolls so that their surfaces are in contact and exert pressure along the line of tangency between the rolls and the belts. It is also necessary that the belts move in a direction which is angularly disposed to the line of tangency of the rolls at some angle other than 90°, "movement of the belts" referring particularly to their movement in the zone of contact and pressure between the belts and the wringer rolls. It is desirable that the surfaces of the belts which contact each other develop considerable friction while the surfaces of the belts which contact the rolls are as smooth and as frictionless as possible.

By arranging the belts in this manner and by driving them, a force is exerted on the sheet material which is angularly disposed to that exerted by the rolls whereby to maintain the output or discharge of the sheet material as a fixed location along the rolls. Any tendency of the driven belt to translate in a manner similar to that described in connection with the sheeting which is being fed may be overcome by permitting slippage between each belt and its corresponding roll. Thus the belts and the wringer rolls in combination with each other provide feeding and tracking means whereby sheeting introduced between the rolls and belts along a path predeterminedly positioned and inclined to the line of tangency therebetween will be discharged therefrom along the same path.

Details of one convenient arrangement of belt means are disclosed in Figs. 1, 2 and 3, it being understood that various other arrangements may be employed without departing from the spirit or the scope of this invention, the belt means functioning with the input rolls 43, 44 to move sheet material through and discharge the same from the input section of the machine along a predetermined path.

The belt means of the drawings comprises two endless belts 36 and 37 arranged for movement over three sets of supports. Each support lies at a corner of a triangle. This arrangement of supports makes it possible to effect movement of each belt 36 in a path which follows the sides of the triangle.

To carry out this construction, use is made of two spaced pairs of aligned rolls 38 and 40 and 39 and 41 respectively and a bank of aligned rolls. The roll bank comprises the input rolls 43 and 44 between which sheeting 22 passes and also rolls 42 and 45 located respectively above and below rolls 43 and 44. All rolls 38 to 45 in the embodiment of Figs. 1, 2 and 3 rotate about horizontal axes. Rolls 39 and 40 and rolls 39 and 41 are respectively supported in conventional manner upon plates 46 and 47, these plates being movably adjustable on the top of the table 20. Rolls 42, 43, 44 and 45 are supported directly upon the top of the table 20. A rotatably mounted roll adapted to carry the sheeting supply 23, is also supported on the plate 46 while plate 47 supports a gear shaft 50 having a gear 49 which is fixed thereon and which meshes with a gear 48 fixed on the shaft of roll 41 so as to rotate roll 41 when gear shaft 50 is driven from the motor 35 in a manner to be later described. Rolls 38 to 41 are rubber or comprise a metal core encased in a rubber sheath and rolls 42 to 45 are formed of a suitable metallic material such as a chrome alloy and are polished.

As shown particularly well in Figs. 2 and 3, the belts 36 and 37 are arranged one above the other. Belt 36 goes around the roll 38, thence under and over the roll 43, then under and over the roll 39, then under and over the roll 42 and then back to the roll 38. The lower belt 37 goes around the roll 40, then over and under the roll 44, then over and under the roll 41 and thence over and under the roll 45 and back to the roll 40. In this arrangement, the parts of the belts 36 and 37 extending at any instant between the rolls 42 to 45 and the pair of rolls 38 and 40 may be thought of as providing the incoming or sheet feeding branch of the input section of the machine while the parts of the belts between the rolls 42 to 45 and the pair of rolls 39 and 41 form an idler branch through which the belts 36 and 37 pass in their cycle of movement.

Conventional pressure-applying means 51 are employed for pressing the rolls 38 and 40 and the rolls 39 and 41 together. With this construction it will be appreciated that the belts 36 and 37 will be continuously driven on actuation of the gear 49 to drive the gear 48 fixed on the shaft of the roll 41. During a cycle of movement, a portion of either belt assumed initially at a position in the feeding branch will move therethrough, into and through the idler branch and back into the feeding branch to its initial position. The path of movements of the belts 36 and 37 may be traced by the arrows shown on the belts in Fig. 3. Suitably supported guides 52 shown in Figs. 1 and 2, may if desired be engaged with the edges of the belts 36 and 37 to insure tracking of the belts in the event slippage between rolls 42 through 45 is insufficient for this purpose.

In threading up the machine, sheeting 22 is led from the supply roll 23 and inserted between the belts 36 and 37 as they pass around the rolls 38 and 40 and thence to the input rolls 43 and 44 and between the latter and the contacting surfaces of the belts which go around the same. With belt rolls 38 and 40 and input rolls 43 and 44 suitably pressed together, operation of the belts will result in continuously unwinding sheeting from the stock roll and feeding the same to the input rolls 43 and 44 in a direction lengthwise of itself and along a path which is predeterminedly positioned and angularly disposed to the line of tangency between the input rolls 43 and 44 and belting which passes around them, this path in the machine of Figs. 1, 2 and 3 being substantially the path followed by the belting thereof in the feeding branch of the belt means.

Belts 36 and 37 are given substantially equal widths which are greater than the width of sheeting undergoing stretching and in the construction of the Figs. 1, 2 and 3 assist in maintaining the sheeting in a substantially flat condition. However, as will hereinafter be pointed out, while it is desirable to maintain the sheeting in a substantially flat condition, such requirement is not an essential. A conventional friction brake engaged to a pulley 53 fixed to the shaft of the supply roll is employed to brake rotation of the latter so as to keep the sheeting 22 under slight tension as it is unwound from the supply roll.

A preferred type of belt, especially adapted for use with sheet material which is rendered increasingly pliable with the application of heat thereto, comprises a belt having a smooth, substantially frictionless surface and a second or opposed surface which is yieldable and tacky. The tacky surfaces of the opposed belts frictionally contact and grip the sheet material as the belts and the input rolls 43, 44 function to feed or move it into the output section of the machine. In addition to these properties a preferred type of belt should also be flexible and resistant to heat and to stretching, that is to say, the belt should maintain its dimensions substantially constant under varying conditions of stress and temperature.

Figure 6:
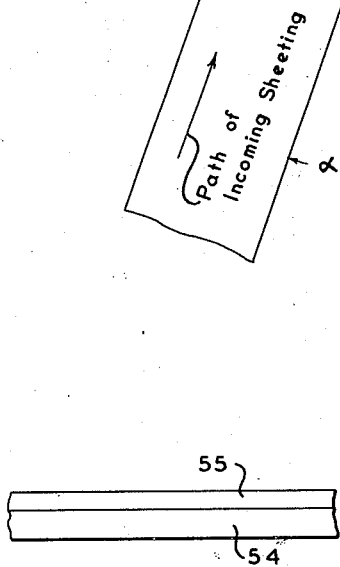
Fig. 6 is a partial elevation of a conveyor belt used with the machine.

A portion of a belt of this type is shown in Fig. 6 and comprises a woven fibrous body 54 formed of cotton or other similar material. The body 54 has a layer 55 of a rubber compound such as neoprene formed on one surface thereof. The layer 55 is applied in coats and impregnates at least a surface portion of the body. In the formation of the layer 55, the body 54 is coated with a thin liquid coat of neoprene latex mixed with water to provide a water emulsion. A plurality of coats of neoprene latex of regular strength are then applied over the first coat of latex. Six coats of the undiluted latex have been found to provide an excellent type of surface for the purposes intended.

A means for driving the belts 36 and 37 comprises a series of belts or sprocket chains 154, 155, 156 which connect a pulley or sprocket fixed on the gear shaft 50, two pulleys or sprockets 56 and 56′ fixed on a vertical shaft 57, and driving and driven pulleys or sprockets 58 and 59 on a gear box 60, to a pulley or sprocket 81 fixed on the drive shaft of the motor 35. The gear box 60 permits the speed of the conveyor belts to be changed at will.

The sheeting 22 which is discharged from the belt means 36 and 37 and input rolls 43 and 44 is received and engaged between the drawing or output rolls 26 which continue its lengthwise movement. The means for driving the output rolls 26 comprise belts or sprocket chains 61, 62 and 63 which connect a pulley or sprocket 161 on one of the output rolls 26, pulleys or sprockets 64 and 65 on a shaft 66 carried by the frame of the table 20, and pulleys or sprockets 67 and 69 on a gear box 68, to a pulley or sprocket 70 fixed on the drive shaft of the motor 35.

In the construction described, it is to be observed that the belt means 24 feed the sheeting 22 at an angle to the output section of the apparatus and always discharge it at the same location. Output or drawing rolls 26, placed at a suitable angle to the incoming direction of the sheet material, may therefore be used to change its path of movement. As already mentioned, it is desirable to apply pressure to the sheeting along the discharge line of the belt means so as to permit the rolls 26 to place the sheeting under a tension which is directed to stretch it. In the drawings, the discharge line is the line of tangency between the belt rolls 43 and 44 and the belts which pass around them and is indicated by the reference numeral 71 in Fig. 4 while 72 indicates the line of tangency of the output rolls 26. Line 71 is also the line along which pressure is applied to sheeting passing through the machine. It is to be noted that line 71 extends transversely across the path followed by the incoming sheeting and is inclined thereto.

Figure 5:
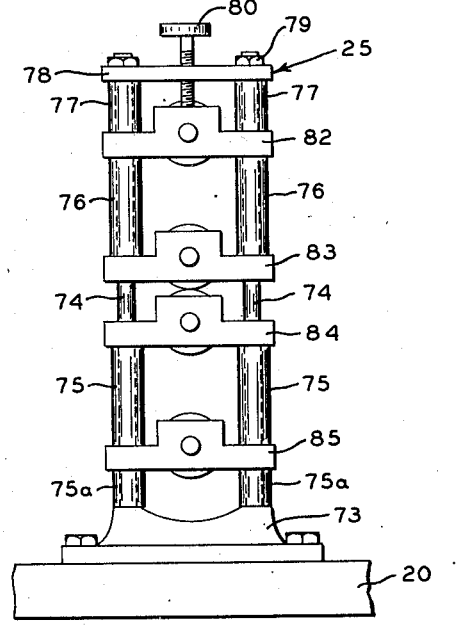
Fig. 5 is a detail elevation of a roll support used in a part of the apparatus.

Mounting means for each end of the rolls 42 to 45 are constructed so that pressure may be applied to the moving sheet material as it passes between rolls 43 and 44 along the line of tangency between the belt means passing over such rolls. One type of mount is shown in Fig. 5 and comprises a base 73 secured to the top of the table 20 and having a pair of mounting posts 74 extending therefrom and slidably engaged by bearing blocks 82, 83, 84 and 85 which respectively support an end of the shafts of the rolls 42, 43, 44 and 45. Bearing block 85 seats upon spacers in the form of tubular collars 75a which are engaged on posts 74 and which are seated on the base 73. Spaced from bearing block 85, by a pair of tubular collars 75 on the posts 74, is the bearing 84. Each bearing block 83 is engaged with posts 74 and has its associated roll contacting the roll carried by the bearing block 84 whereby each bearing block is supported in the manner illustrated. Tubular collars 76, each engaged on a post 74 and supported by bearing 83, provide a seat for bearing block 82.

Collars 77 on each post seat on the top of bearing block 82 and support a plate 78 which is held on the posts 74 by nuts 79 on the threaded ends of the posts 74. A pressure screw 80 extends through the plate 78 and is adapted to contact the bearing block 82 centrally thereof above the axis of the shaft of the belt roll 42. By this construction it will be appreciated that suitable adjustment of the screw 80 will cause pressure to be applied to the bearing block 82. This pressure will be transmitted through the collars 76 to the bearing block 83 which will cause the belt rolls 43 and 44 to be moved towards each other and the pressure between them and the belts to be increased.

As a mount of the character shown in Fig. 5 is employed to support each end of the rolls 42 to 45, it will be apparent that adjustment of the respective pressure screws 80 of the mounts may be employed to regulate the pressure between the contacting belts around rolls 43 and 44. In addition, since the pressure screws 80 apply a pressure centrally of a bearing block, this pressure will be transmitted for application substantially along the line of tangency of the belts 36 and 37, to apply a frictional force to the surfaces of the incoming sheeting.

All of the belt rolls have been described as being rotatably mounted. It is to be noted, however, that the rolls 42 to 45 inclusive may be braked or locked so that they remain stationary so long as the belting readily slides over these rolls. Under these conditions the rolls act as supports for the belting.

As heretofore indicated, the forces set up in the sheeting in its movement through the two selected paths will cause the sheeting to be stretched and at the same time will orient the molecules of the sheeting. The physical meaning of the angles $\alpha$ and $\gamma$, which angles determine the paths along which the sheeting is moved when undergoing stretching, may be understood with reference to the machine of Figs. 1, 2 and 3 as set up in the manner therein generally illustrated. As will presently appear, other machines may be employed to carry out the invention. However, the physical meaning of the input angle $\alpha$ and the output angle $\gamma$ used in connection with the machine of Figs. 1, 2 and 3 will be the same for any machine of the invention.

Figure 4:
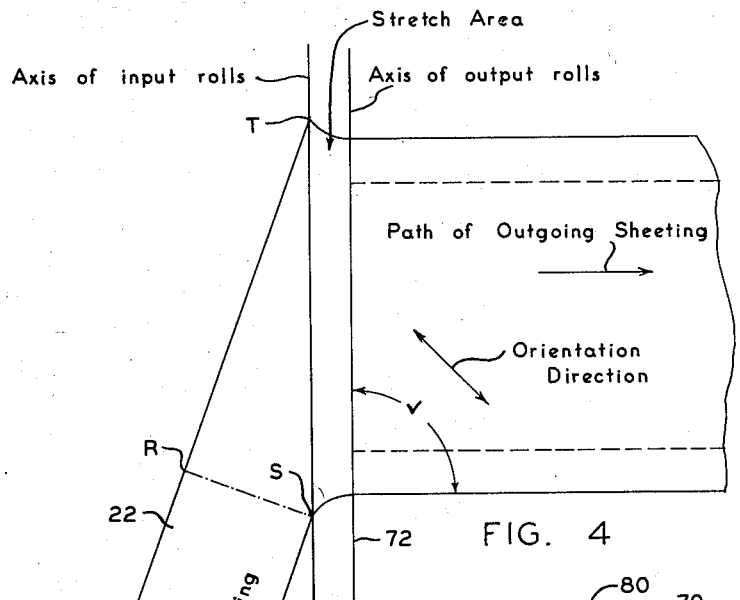
Fig. 4 is a diagrammatic plan view of the machine of Figs. 1, 2 and 3 and shows the path of movement of the sheet material through the machine.

Movement of the sheeting through the machine of Figs. 1, 2 and 3 is disclosed in the diagrammatic representation of the machine in Fig. 4. As may be observed in Fig. 4, the width of the sheeting after stretching is roughly equal to the hypotenuse ST of the right triangle RST shown in Fig. 4 of which the side RS is the original width of the sheet and the adjacent acute angle RST is equal to the angle through which the sheet is turned in following its path through the output section of the machine. The magnitude of the angle RST is of course dependent upon the position of the incoming branch of the belt means 24. Angle RTS which is the complement of the angle RST gives the angular relation of the incoming sheet material with respect to the output section of the apparatus. It may be here mentioned that while in Fig. 4 the width of the sheeting is increased by stretching, through the use of other practices it is possible to reduce the width dimension. Width dimension alterations of both types are included within the scope of the invention and further reference thereto will again be made.

Angle RTS is equal to the acute angle between the edge of the sheeting opposite the edge RT and the line of tangency 71, this latter angle being called the input angle $\alpha$. $\alpha$ may be defined as the angle the edge of the incoming sheet makes with the input rolls or with the line of tangency between the input rolls and the belt means measured from a location facing the path in which the sheet moves and in a direction which is counterclockwise from an edge of such sheeting to an extension of the line of tangency 71, it being again noted that the line of tangency forms the discharge line of the input rolls and also that pressure is applied to the surfaces of the sheeting along this line.

The line 72 in Fig. 4 represents the line of tangency between the output rolls 26 and also a line along which pressure is applied to the sheeting as it is drawn by the output rolls. Since the axes of these rolls are parallel to the axes of the input rolls 43 and 44, the line 72 will be parallel to line 71. The output angle may be defined as the angle which the outgoing sheet makes with the drawing rolls measured from a location facing that edge of the moving sheeting from which $\alpha$ is measured and in a direction which is counterclockwise from such edge to the line 72. In Fig. 4, the output angle $\gamma$ may also be defined with reference to the position of the input rolls.

As heretofore pointed out, the orientation $\phi$ and the axial ratio K of stretched sheet materials are dependent upon the speed ratio $u$ and the input angle $\alpha$ and the output angle $\gamma$. In the machine of Figs. 1, 2 and 3 the rate of speed at which the incoming sheet is moved and the rate of speed at which the outgoing sheet is moved is controlled through the gear boxes 60 and 68. Means are provided in the machine of Figs. 1, 2 and 3 for adjusting the belt means 24 so as to obtain a predetermined input angle $\alpha$, the output angle $\gamma$ in this embodiment being substantially maintained at 90°.

One construction permitting variation of the input angle mounts the belt rolls 38 and 40 and 39 and 41 on plates 46 and 47 which may be moved over the top of the table 20. The plates 46 and 47 are held in adjusted position by fastening means 87 such as removable bolts which secure them to the table top. To adjust the belt means 24, the fastening means 87 are loosened and the plates 46 and 47 are moved to their desired position, such for example as that shown in the dotted lines of Fig. 1. After being suitably adjusted, the plates 46 and 47 are again secured to the top of table 20.

In the adjustment of the input angle, the feeding and the idler branches of the belt means 24 are positioned so that they still follow the sides of a triangle as previously described. Since the sprocket chain or drive belt 154 will pivot around its sprocket or pulley 46 on shaft 57 and the sprocket or pulley fixed to gear shaft 50, it will be apparent that the just-described adjustment of the belts 36 and 37 may be readily effected.

It is to be understood that the adjusting means for the plates 46 and 47 may be varied in construction and arrangement. For example, plates 46 and 47 may be mounted upon tracks or guides and means involving the principles of the screw may be used to effect desired movement of the plates or suitably actuated lever means may be employed for this purpose.

In the stretching of plastic sheet material by the practice described herein, there is a tendency for the molecules of the material to be nonuniformly oriented in a strip of the material which extends laterally from each edge of the sheeting for a short distance towards the center line of the sheeting. Between these edge strips, the molecules of the sheet material are substantially uniformly oriented. This nonuniform orientation along the edges of the sheeting is termed "edge effects." Theoretically, these edge effects would be eliminated if there were no distance separating the drawing or output rolls 26 and the input rolls 43 and 44 in the vertical roll bank. It is therefore desirable to place the drawing rolls 26 as close to those in the vertical roll bank as possible. However, in some instances it is preferable to soften the sheet material before stretching it so as to facilitate its stretching. For example, it is desirable to soften sheet material which is difficultly yieldable when in normal or hardened condition and which is liable to break or tear during stretching and which is rendered more ductile when in a softened condition. Softening may be effected by the use of liquids or solutions or gases which have the property of softening the sheet when absorbed thereby or which enter into some reaction resulting in the desired softening. Heat may also be employed to soften sheeting and softening by heating is preferred. For this purpose, a hot gas may be employed or the sheeting may be subjected to a bath or spray of a heated liquid or solution which will function solely to transfer heat to the sheeting. As an example, thermoplastic materials are mentioned as materials which are preferably stretched when in a heated condition.

The solution of the problem of heating the sheet material while keeping the output rolls 26 in close proximity to the input rolls 43 and 44 is made possible by sheet-softening means 27 in the form of hot air distributing ducts shown in detail in Figs. 7 and 8, and comprising two narrow metal ducts 89 and 90, one located above and the other located below the path of travel of the sheeting in the output section of the apparatus. Each duct 89 and 90 is of a length which is greater than the width of the sheet material 22 being processed and extends across the path of travel of the sheet material.

The ducts 89 and 90 are substantially similar and each may be formed of a hollow body portion 91 joined to a pipe or conduit 92 adapted to be connected to a header 93 through which hot air from a suitable source, not shown, is blown for distribution to the ducts. Pipe 92 is provided with a narrow slit or series of aligned openings 94 in the portion thereof which is joined to the body of its duct to permit heated air to be distributed throughout the body 91. An elongated discharge orifice or slit 95 of a length substantially equal to the length of the duct is provided in the end of the body 91 which is most distant from the conduit 92. As shown in the drawings, this end of the body is bent so that the discharge of air from the body 91 takes place at an angle with respect to its entry into the duct body. The ducts are positioned so that the discharge through their orifices 95 is directed entirely across the sheeting towards the discharge line or line of tangency between rolls 43 and 44 and the belts around these rolls, this line being indicated at 71 in Fig. 4. An important feature of the heating ducts 89 and 90 besides their narrow bodies resides in their bent body portion which causes the heated air to be directed between the belts and concentrated onto the sheeting 22 as it discharges therefrom substantially along the discharge line of the belt means.

The temperature of the zone adjacent the moving material and between the rolls 43 and 44 and the output rolls 26 will indicate the degree to which the sheeting 22 is heated. In the case of plastic sheet material which is being stretched, it has been found that heating this zone to temperatures of from 80° C. to as high as 200° C. works excellently while a range of from 125° C. to 140° C. may be noted as the optimum temperature. Obviously, higher or lower temperatures may be obtained in this zone by the use of conventional means for heating the air supplied to the zone. It will be appreciated that in general the kind of material, its thickness and the speed at which it is moved to the drawing rolls will influence the preferred heating temperature.

If desired, the sheeting 22 on discharge from the output rolls 26 may be wound or reeled up. When the sheeting has been softened to facilitate stretching it may be preferable, especially in the case of certain thermoplastic materials, to reharden the sheeting under tension before either winding up or subjecting it to further processing. Rehardening under tension is particularly desirable in the case of stretched sheeting which is in a softened condition and which has a tendency to return to its original dimensions unless it is hardened under tension. In addition, it is desirable to have the stretched sheeting in as unyieldable condition as possible when it is subjected to further processing as, for example, when it is laminated to other sheeting, in order to avoid alteration of the properties imparted to the sheeting as a result of the predetermined stretching thereof.

One practice for effectively hardening sheet materials which have been softened by heat makes use of an extended cooling zone located between the output rolls 26 and the laminating rolls 96 and 97 shown in the machine of Figs. 1, 2 and 3 of the drawings. In this practice a plurality of rolls 28 are suitably mounted, as shown in Figs. 1, 2 and 3, upon the frame of the table 20 for rotation about axes which are substantially parallel to the axes of output rolls 26. The sheeting 22 is passed over and under alternate rolls 28, suitable tensioning of the sheeting in the construction illustrated being effected by the laminating rolls 96 and 97 with which the sheeting is engaged. A plurality of rolls 28 are employed, five of such rolls being shown, although it will be understood that a greater or less number of rolls 28 may be used if desired.

Rolls 28 while freely rotatable are not necessarily driven. These rolls may also be formed of a chrome alloy and are polished although suitable metals and other alloys may be employed in their construction. The length of the cooling zone provided by the rolls 28 is determined by the temperature to which the sheeting is to be heated, and is also influenced by the speed at which the sheeting is to be run through the cooling section.

Preferably, only that portion of the sheet wherein substantially uniform molecular orientation occurs is employed. Hence, it is desirable to cut away the edges of the sheet wherein the edge effects occur. Cutting of the sheet is made possible by the use of cutting means 29.

An alternate construction making it possible to reduce the length of the cooling zone is disclosed in Fig. 2a wherein the use of only one roll 28 is shown. Shortening of the cooling zone is effected through the use of means 128 through which cold air is blown onto the sheeting as it leaves the output rolls 26. Means 128 may comprise a suitable duct through which cold air, from a source of supply, is blown, or other cooling device. Additional cooling means may be employed with the construction of Fig. 2a if desired and such additional means may be located on the same side of the sheeting as means 128 or on the opposite side of the sheeting.

Other cooling practices may be employed. For example, cooling may be effected by suitable liquids or solutions used as baths or sprays for the softened or heated sheeting. Speaking generally, when employing agents in liquid form for hardening sheeting, it is desirable to use an agent which will not be absorbed by the sheeting but which will enter into some reaction resulting in the sheeting being hardened. Such concepts fall within the scope of this invention.

One suitable cutting means comprises a pair of supports 98 which extend above the top of the table 20 on each side of the path of the moving material 22 and support a roll 99 and a reel shaft 100 between them. Roll 99 and shaft 100 rotate about axes which are substantially parallel to the drawing rolls 26. Reel shaft 100 is driven although roll 99 is not. The cooled sheet material 22 in its passage through the machine passes over the roll 99 and thence around a guide roll 101 to the laminating and drawing rolls 96 and 97. Supported from the bearing blocks for the roll 99 is a horizontal rod 102 which carries a pair of razor-edged knife means 103. Rod 102 extends across the path of the moving material and is substantially parallel to the various roll axes. The knife means 103 are adjustable longitudinally of the roll 102 and are positioned between the longitudinal edges of the sheeting 22 and in cutting contact therewith at a location in its path of movement between the last roll 28 and the roll 99 whereby to cut a strip of predetermined width from each side of the sheet material.

The main body portion of the sheet material 22 passes over the roll 99 and partially around the guide roll 101 from which it passes to the drawing and laminating rolls 96 and 97 while the cutaway edges 104 are engaged to and reeled upon the reel shaft 100. Means for driving the reel shaft 100, which serves as reeling mechanism for winding up the cut edges 104 of the sheeting, comprise a pulley or sprocket 105 fixed on the shaft 66 and connected by a belt or sprocket chain 106 to a pulley or sprocket 107 fixed to the shaft 100.

After the sheet material 22 has its edges cut away, it may be wound upon a roll or as shown in the drawings it may be laminated to a second sheet material 31 to provide composite sheeting 34. The sheeting 31 is generally supplied in an unstretched condition and is laminated to the sheeting 22 for a number of reasons. Some materials, for example, certain plastic materials, tend to absorb water with a resultant change in their dimensions. A change of dimensions may be expected to counteract the effect of stretching and, at least in the case of stretched plastic materials, render the orientation of the molecules heterogeneous. Likewise, some materials if not stretched beyond the elastic limit tend to return to their original shape or dimensions. Under such circumstances it is hence generally desirable to laminate stretched sheet material immediately to other sheet material as the bonded sheet materials will provide increased resistance to dimensional change. Other reasons for laminating a second sheet material to the stretched sheet material are to protect the latter, at least on one side thereof, or to provide a support onto which still another layer of sheeting may be laminated or a support upon which some material, for example a light-sensitive emulsion, may be carried.

In carrying out the laminating practice, the cut sheet material 22 after passage over roll 101 is drawn between the rolls 96 and 97 which are held in pressure contact with each other. Roll 96 is mounted for rotation about a horizontal axis and is carried by a fixed support which extends above the top of the table 20. Roll 97 is carried by a frame 108 which is hinged as indicated at 109 to the frame of the table 20. When the roll 97 is in its working position it rotates about a horizontal axis, which, like the axis of the roll 96, is substantially parallel to the axes of the other rolls in the output section of the apparatus. Conventional means such as a spring device (not shown) are employed for retaining the rolls 96 and 97 in contact so that they will draw the sheet materials 22 and 31 lengthwise of themselves and into contact with each other on the rotation of the rolls. The frame mounting 108 is pivoted for convenience in initially introducing the two sheet materials 22 and 31 between rolls 96 and 97. Sheeting 31 as already mentioned is obtained from a supply 32.

The supply 32 is carried by a roll 117 rotatably supported upon the table for rotation about an axis which is substantially parallel to the axes of the other rolls in the output section of the apparatus. A friction brake 118 is provided on the shaft of the roll 117 so as to keep the sheeting 31 under tension. Roll 96 is driven from the motor 35 through the gear box 68 in a manner already described. Both of the rolls 96 and 97 are formed of rubber or they may be constructed with a metallic core which is covered with a rubber sheath.

For the purpose of laminating materials which may be bonded together with a laminating agent, use is made of a tank 110 containing a suitable laminating fluid. Tank 110 is positioned above the rolls 96 and 97 and is provided with suitable dispensing means, as shown in the drawing, for dropping the fluid between the sheet materials 22 and 31 as they pass between these rolls.

The two-ply laminated sheeting 34 may be wound into a roll or it may be further processed.

In the former case use is made of winding mechanism 33 having a roll 112 mounted for rotation about a horizontal axis which is parallel to the other roll axes in the output section. Roll 112 is removably mounted upon a shaft carried by the frame of the table 20. This shaft is driven by a pulley or sprocket wheel 116 fixed thereto and connected by a belt or chain 115 to a driven pulley or sprocket wheel 114 on the driven shaft 66. For winding purposes, the laminated sheet 34 before being connected to the winding roll 112 is led partially around guide rolls 111 which are carried by the frame of the table 20 and which are freely rotatable about horizontal axes parallel to the axes of the other rolls in the output section of the machine. It will be appreciated that actuation of the motor 35 to drive the pulley or sprocket 67 will cause rotation of the roll 112 to wind the laminated sheeting 34 thereon.

Further processing of the two-ply laminated sheeting 34 instead of immediately winding it into a roll may be beneficial. For example, where two plastic sheet materials are laminated to each other with the aid of a laminating or bonding fluid, it may be desirable to subject the bonded materials to heat for the purpose of hardening the lamination. In this event, the two-ply sheeting 34 may be drawn through a heating oven before it is wound.

While the supply 32 has been described as a single-ply sheeting, a roll of two-ply laminated sheeting such as sheeting 34 may be mounted on the supply roll 117 as a variation of this practice. It is to be understood that the supply rolls and the winding roll 112 are removably supported for the purpose of receiving new material and for taking off processed material. Where two-ply laminated sheeting is mounted upon the supply roll 117, it may be led off the roll and between the rolls 96 and 97 in a manner to have either side thereof bonded to the stretched sheet material 22. In lieu of this practice, stretched sheeting may be mounted upon the supply roll 117 and laminated to sheeting which is also in a stretched condition.

As a further variation, two machines may be positioned with the ends of their output sections adjacent each other. With such an arrangement two-ply sheeting formed by one of the machines may be led to the rolls 96 and 97 of the second machine and directly laminated to the stretched sheeting produced by the second machine.

Modifications in the structure of the machine are within the scope of this invention. For example, in the machine of Figs. 1, 2 and 3, sheeting 22 from the time it leaves the supply roll 23 until its discharge from the drawing rolls 26 is shown as moving in a substantially horizontal plane. Such practice need not necessarily be followed and a variation thereof is shown in Fig. 9 of the drawing which illustrates a modification of a portion of the machine of Figs. 1, 2 and 3 suitable for effecting such variation, Fig. 9 being an elevation of a modified machine with parts omitted and broken away and with parts in section corresponding to the view of the machine shown in Fig. 2.

The machine of Fig. 9 comprises a stand or table 120 adapted to carry the various elements of the machine. Shown mounted thereon are a bank of rolls comprising rolls 142, 143, 144 and 145 supported from the table in a manner similar to the rolls 42 through 45 of Fig. 2 but having their axes lying in a plane inclined to the horizontal or to the top of the table 120. Belt means 124 corresponding to belt means 24 are employed for feeding the sheeting in the manner described lengthwise of itself along a path which makes an angle with the line of tangency between the input rolls 143 and 144 and the belt means 124 in a manner similar to that heretofore described in connection with the belt means of Figs. 1, 2 and 3.

It is to be noted, however, that belt means 124 are generally inclined to the horizontal, sloping upwardly from the supply roll for the machine of Fig. 9 (not shown) to the bank of rolls 142 through 144. In the construction of Fig. 9 output or drawing rolls 126 are disclosed as suitably supported above the table top 129 and having their axes located below the axes of the input rolls 143 and 144. The sheet is drawn by the rolls 126 from the rolls 143, 144 downwardly towards the table top. The machine of Fig. 9 is merely illustrative as it is apparent that variations therein whereby the supply roll of sheeting is at an elevation above the rolls 143, 144 and the output rolls 126 are located above the input rolls 143, 144 are within the concept of the invention.

In the machines heretofore described the belting in the incoming section of the belt means between the input rolls and the end belt rolls 39 and 40 is shown as having its adjacent surfaces more or less in contact throughout the incoming section. Such an arrangement is not essential. In fact the belts of the belt means 24 and 124 may be opened up, that is, spread apart from each other, the only requirement as to contact being that they contact each other along the line of tangency between them and the input rolls while they move in a predetermined direction as heretofore noted. Thus, any support afforded the sheeting being fed to the input rolls by the belt means is more incidental to the belt arrangement employed than essential. However, as pointed out, contact between adjacent surfaces of the belt means assists, at least to some extent, in feeding the sheeting to the input rolls in a substantially flat condition although feeding in this manner is also not necessary to the operation of the machine.

The machines of the invention will operate to stretch sheeting when the same is fed to and drawn from the input rolls in a wrinkled or in a curved or in a folded condition, or for that matter in any condition other than a flat condition. Under these circumstances, however, the orientation of the sheeting will lack uniform character whereas uniformity of orientation is substantially obtained, except for the so-called edge strips, when the sheeting is fed or moved to the input rolls and is drawn therefrom in a substantially flat condition.

The machines which have been described have shown the line of tangency between the input rolls and belt means as substantially parallel to the line of tangency of the drawing rolls. An arrangement whereby the line of tangency between the drawing rolls is angularly disposed to the line of tangency between the input rolls and belt means is within the concept of this invention. For example, and with reference to Fig. 1, the axes of the rolls 26 and hence the line of tangency between them may be inclined to the axes of the input rolls, or in other words to the tangent between the input rolls and the belt means 26 so that the line of tangency between rolls 26 slopes away from the line of tangency between the input rolls and belt means in the plane of Fig. 1. The effect of such an arrangement is merely to provide an output angle γ other than 90°. In certain instances it may be desirable to have a construction whereby the output angle γ may be predeterminedly varied. An arrangement of this character is disclosed in Fig. 10.

Figure 10:
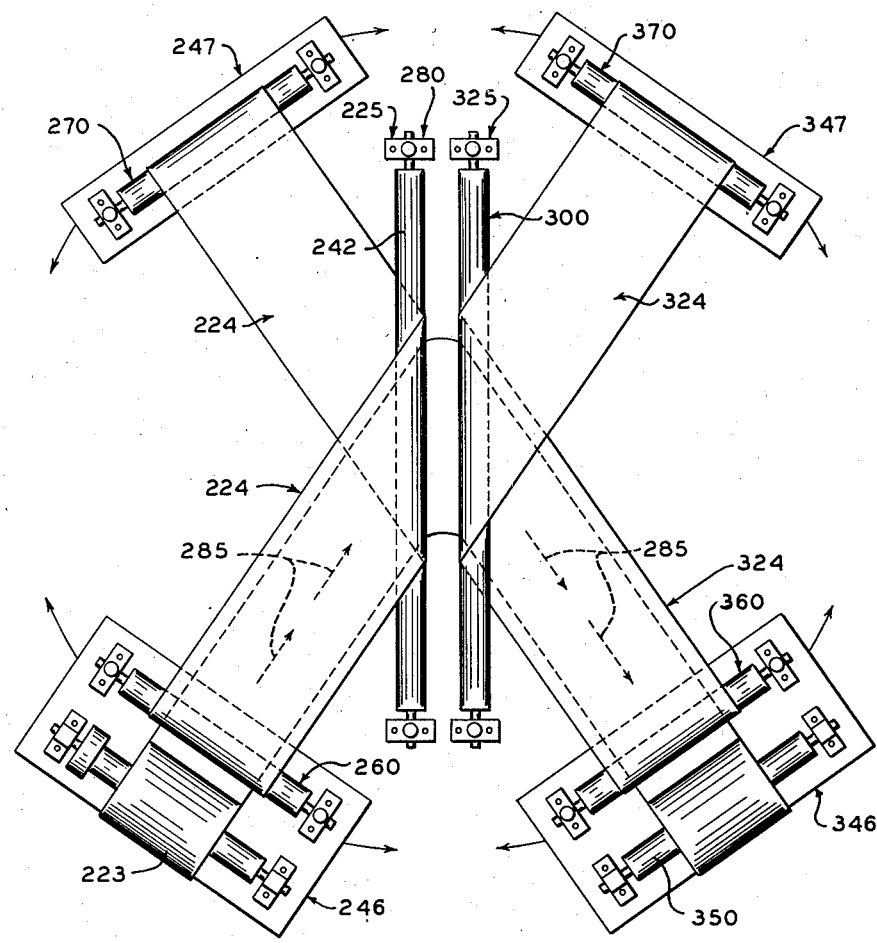
Fig. 10 is a plan view showing another embodiment of stretching apparatus with parts omitted for the sake of clarity.

Fig. 10 is a plan view similar to Fig. 1 and shows a machine of the general construction of that disclosed in Figs. 1, 2 and 3 but suitably modified so as to permit adjustment to provide a variable output angle γ as well as a variable input angle α. To effect this purpose, mechanism similar to that in the input section of the machine of Fig. 1 is employed in the input section of the machine of Fig. 10. Such mechanism comprises a bank 280 of four rolls, the upper roll being designated by the reference numeral 242 and the inner two of these rolls providing the input rolls of the machine together with driven belt means 224 which pass around the various rolls of the roll bank just described and also around suitable pairs 260 and 270 of belt rolls, each pair of belt rolls being mounted upon individual plates 246 and 247. The pairs of rolls 260 and 270 respectively correspond to the pairs of belt rolls 38, 40 and 39, 41 of Figs 1, 2 and 3. Plate 246 also carries a supply roll 223 having a supply of sheeting 222 mounted thereon.

Sheeting 222 from the supply roll 223 is fed to the input rolls of the roll bank 280 in the manner already described in connection with Fig. 1, its direction of movement being indicated by the dotted arrows 285 in the path traveled by the belt means 224 in the incoming section of the machine. Plates 246 and 247 are suitably mounted for adjustment and may be moved in the direction of the arrows adjacent each plate 247. Such adjustment effects a change of the input angle α in the manner heretofore set forth. Rolls in the bank 280 are mounted by a construction providing means 225 similar to means 25 of Figs. 1, 2 and 3 for applying pressure to the input rolls and belt means around the same so as to place them in pressure contact.

The output section of the machine of Fig. 10 differs from the output section of the machine of Figs. 1, 2 and 3 in that a vertical roll bank 300 comprising four rolls like those of the roll bank 280 and the use of driven belt means 324 similar to belt means 24 and 224 are employed. In the machine of Fig. 10 the middle pair of rolls of the roll bank 300 provide the output or drawing rolls for the device. Pressure-applying means 325 similar to pressure-applying means 225 and 25 are utilized for pressing the drawing rolls of the roll bank 30 and the belt means into pressure contact with each other. The belt means 324 in addition to being supported upon the rolls of the roll bank 300 is carried upon two pairs 360 and 370 of suitable belt rolls which are mounted upon plates 346 and 347. Plates 346 and 347 are suitably mounted for adjustment in the direction of the arrows adjacent each plate so that the output angle γ of the machine of Fig. 10 may be varied.

In the machine of Fig. 10, the outgoing sheet, that is the sheet material in the output section of the machine is engaged by the drawing rolls of the roll bank 300 and caused to follow a path indicated by the dotted arrows 385 on the belt means 324. A driven take-off roll 350 winds up the stretched sheet as indicated. Roll 350 is driven by any suitable means, not shown for the sake of simplicity in the drawings. Likewise for simplicity, means for driving the belt means 224 and 324 have been omitted from the drawings.

As shown in Fig. 10, the input angle α and the output angle γ both differ from 90°. With reference to definitions previously noted, the input angle of the machine as shown in Fig. 10 is less than 90° while the output angle thereof is greater than 90°. It will be apparent that the belt means 324 may be arranged to provide an output angle γ of 90°, in which event the machine of Fig. 10 substantially duplicates the machine of Figs. 1, 2 and 3. It is also possible, in a construction like that of Fig. 10 to obtain an output angle γ which is less than 90°. Also to be noted is the fact that the output angle of the machine of Fig. 10 may be held at a value of greater than 90° and the belt means 224 adjusted so that the input angle α is substantially 90° as well as the fact that the machine may be adjusted so that the input angle α and the output angle γ are equal to each other although for reasons which will presently appear α and γ are not adjusted to give values having a sum of 180°.

Roll banks 280 and 300 are placed as closely together as is possible, heating means similar to those disclosed in connection with Figs. 1, 2 and 3 are mounted between the input and output rolls in a manner similar to that heretofore described, such heating means being omitted for the sake of simplifying the drawings. If the belt means 324 are sufficiently long, the sheet in the output section of the machine of Fig. 10 will be sufficiently cooled by the time it reaches the wind-up roll 350 so that no special cooling zone will be needed. However, if desired, a cooling section may be inserted between the pair of belt rolls 360 and the wind-up roll 350 as well as means for cutting off the nonuniformly oriented edge strips of the sheet. Of course, the wind-up roll may be dispensed with and the stretched sheeting discharged from the output section of the machine of Fig. 10 may be led to laminating rolls and the other elements shown in the machine of Figs. 1, 2 and 3 for further processing.

Also contemplated within the scope of this invention is the successive processing of sheet material by several machines arranged in tandem or in series so that the output section of the first machine is adjacent the input section of the next machine and so on. By this practice, sheeting discharged from the output rolls of the first machine will be received and fed to the input rolls of the second machine and so on for the remainder of the machines in the series. An arrangement of this character will subsequently be described.

Other variations in practice, besides those just heretofore mentioned, are possible as will be well appreciated by those skilled in the art. It is to be understood that such variations are deemed to fall within the scope of the invention.

As previously pointed out, the process and apparatus of the invention are adapted for stretching a variety of sheet materials and are especially suitable for stretching plastic sheeting for optical, photographic and other purposes. The adaptation of the basic principles herein described to the stretching of sheet materials which are thicker and less flexible or relatively more rigid than plastic sheeting is primarily one of constructing the stretching apparatus of a sufficiently sturdy and strong character to handle these materials.

In addition, it will be appreciated that various elements of the apparatus forming the subject of this invention may be employed in other processes and with machines other than those heretofore set forth. For example, the belt means which have been described in connection with the various machines are particularly suitable for feeding or moving sheet material lengthwise of itself along a predetermined path and may be employed for this purpose in apparatus which will not stretch sheeting. As an example, the belt means may be used as an expedient or apparatus for conveying sheeting. Likewise the belt means may be used in conjunction with other types of sheet-stretching apparatus, for example, sheet-stretching apparatus designed to stretch or extend the sheeting lengthwise of itself. For that matter, it will be apparent that the machines forming the subject of the invention may be adjusted so as to provide stretching of the character last mentioned.

For optical, photographic and illuminating purposes, transparent plastic materials having long-chain molecules may be employed for the sheet 22. Transparent, hydrophilic, high molecular weight linear polymers which may have their molecules oriented and which are capable of forming a dichroic sorption complex with dichroic stains and dyes are especially suitable when polarized light is involved and specific examples of these comprise polyvinyl alcohol, polyhydroxy alkane, partially hydrolyzed polyvinyl acetals and polyvinyl alcohol esters, amylose and regenerated cellulose as well as suitably prepared polyamides or nylon-type plastics. Of these materials, polyvinyl alcohol may be mentioned as preferred.

The support or protective sheeting 31, which is laminated to the sheeting 22 to provide a two-ply or composite sheet material 34, may be formed of a cellulosic plastic. Examples of such cellulosic plastic comprise cellulose esters such as cellulose acetate and cellulose nitrate or cellulose mixed esters such as cellulose acetate butyrate or cellulose acetate propionate, or a vinyl compound, such as the vinyl acetate-chloride copolymers, or a suitable condensation-type superpolymer, such as a suitable polyamide or nylon-type plastic. The various types of cellulose esters such as cellulose nitrate and cellulose acetate butyrate may be named as preferred transparent materials for the support. Suitably prepared cellulosic plastics may also be employed as optical elements themselves. For example, any of the cellulosic sheet materials just mentioned may be appropriately stretched to provide a wave retardation element useful, for example, for varied optical purposes. The sheeting 31 is subcoated with a suitable material, as will be understood to the art, which will laminate directly to one of the materials named for use as the stretched sheeting 22, preferably when wetted with water or a solvent used as a laminating solution.

As it has been pointed out, the machines of the invention are adapted to the processing of continuous sheet material, that is to say, sheeting in extremely long unbroken or uninterrupted lengths. For example, any of the plastic sheet materials just previously mentioned, may be obtained in rolls having lengths up to 5,000 feet and greater. Rolls of this character may be employed as the raw stock to be processed by the machines described herein. Material of substantially any width may be processed by machines of the invention, the maximum width of sheeting which a machine will handle being dependent only upon the capacity of the machine. Plastic sheet materials are obtainable, at present, in maximum widths of around 30 inches and are also procurable in widths of as little as several inches. In instances where relatively narrow continuous sheeting is desired, as in the case of motion picture film, relatively wide processed sheeting comprising a single layer or a lamination of several layers may be cut lengthwise of itself to form continuous strips of the desired width by the use of conventional cutting means.

As an example of a product produced by the machines of the invention, reference is made to Fig. 18 which discloses film material 130 suitable for motion picture work and comprising a support layer 131 formed of any of the mentioned support materials, for example, cellulose acetate butyrate, to opposite sides of which there is laminated stretched and oriented image-carrying layers 132 and 133 of sheet material such, for example, as polyvinyl alcohol. The orientation axes of the layers 132 and 133 are at right angles to each other and are inclined at an angle of 45° to the longitudinal edges of the film as indicated by the full line and dotted arrows in Fig. 18. Film material 130 is admirably suited for the formation of light-polarizing stereoscopic images therein, left-eye images being formed in one image-bearing layer and right-eye images only being formed in the other image-bearing layer in the portions thereof forming the successive frames of the film material.

Additional image-bearing layers of the character of layers 132 and 133 superposed and laminated on opposite sides of the film material 130 permit the formation of light-polarizing color image components therein whereby to permit stereoscopic reproduction in color. Alternatively, continuous film material may be provided for the production of two-dimensional pictures by the use of a support having a single layer thereon, or a support having one or more layers on the same or opposite sides thereof, these layers having an orientation axis angularly disposed to the longitudinal edge of the film material and in the case where several layers are used, orientation axes which are parallel to each other.

Light-polarizing images may be formed in oriented image-bearing layers which are either sensitive or substantially insensitive to light by methods well understood to the art which effect the incorporation of dichroic stains and dies in predetermined portions of the layer. Light-polarizing images of this character, namely, vectograph images, have an optical density which is a function of the vibration direction of the incident light used in viewing or projecting such images. Film material 130 containing a light-sensitive substance may have the same incorporated in the image-carrying layer thereof by imbibition after formation of the film or the light-sensitive material may be cast in the raw stock which is to be stretched. In the latter instance, the stretching is carried out under safe light conditions.

Lamination of the several layers forming the film material 130 may be carried out in the manner already described, for example, by laminating two-layer material formed by one machine to single-layer material discharged from a second machine.

It is believed that from the foregoing the operation of the processes and apparatus will be apparent especially when coupled with the following explanation in regard to stretching, wherein for the purpose of explanation, the stretching of plastic sheeting will be considered in detail.

The effect of stretching on plastic sheeting may be determined empirically by printing a plurality of circles at intervals along a surface of the sheeting in its unstretched condition. When this sheeting is then processed in the apparatus of the invention it will be found that the circles have been converted into ellipses having major axes which extend transversely of the sheet material in a direction which is inclined to the longitudinal edge of the sheeting.

For all practical purposes it may be shown by staining the processed sheet material with a dichroic substance and examining it in polarized light, that the orientation direction or the orientation axis of the molecules of sheet material so stretched will substantially coincide with the direction taken by the major axes of the ellipses formed from the printed circles as a result of stretching. This means that the molecules of the sheeting have been oriented in a direction which is substantially parallel to the direction of the major axes of the ellipses and gives the orientation angle $\phi$ with respect to a longitudinal edge of the sheeting. The orientation angle $\phi$ is defined as one of the interior angles between a longitudinal edge of the sheeting and the orientation axis measured from a location facing such edge and in a direction counterclockwise from that edge to the orientation axis. For example, in Fig. 4 the orientation angle is measured counterclockwise from the inner edge of the sheeting, that is the edge of the sheeting which determines the input angle $\alpha$, and as there illustrated is equal to 135°. From the outer or opposite edge of the sheeting the orientation $\phi$ in Fig. 4 as measured in a counterclockwise direction is of course 45°.

The fact that the axes of an ellipse are of unequal magnitude permits an indication of the degree of orientation of the molecules of the sheeting in the ratio of the major axis of the ellipse to the minor axis, this ratio being the previously-referred-to axial ratio K.

It may be further shown empirically, by the procedure just described, that variations in the input angle $\alpha$ and/or the output angle $\gamma$ and/or the speed ratio $u$ will affect the orientation $\phi$ and the axial ratio K produced in the sheeting by the operation of the machine.

As previously pointed out, Fig. 4 shows that the width of the sheeting after stretching is roughly equivalent to the hypotenuse of a right triangle of which one side is the original width of the sheeting. An increase in length of the sheeting may also take place with stretching. It is apparent, however, that stretching is subject to an area condition in that the area of the sheeting after being stretched can never be less than its area before stretching.

A small percentage of the width of the sheeting will be subject to necking down when it changes path in its movement during the stretching process, the previously-mentioned edge effects occurring as the sheeting necks down. With reference to Fig. 4, it may be observed that the necking down is not made abruptly but that the sheeting tapers gently inwardly towards its center as is indicated by the lines representing the edges thereof in the stretching area. Necking down occurs under most conditions on the outside edge of the sheeting and under some conditions on the inside edge of the sheet. When an orientation $\phi$ of 135° or 45° is obtained at a 1:1 speed ratio on the machine of Figs. 1, 2 and 3, there is an excess of material along the inside edge of the sheeting where at least only limited stretching takes place. If the input rolls and output rolls were not spaced apart with respect to each other, elimination of the necking down effect on the sheeting could be expected. The so-called necking down of the sheeting due to separation of the input and output rolls takes place regardless of how the width dimension of the sheeting is altered by the stretching process, that is whether stretching increases the width of the sheeting as in Fig. 4 or whether, as will subsequently appear, the width of the sheeting is decreased by stretching.

Observation of the stretched sheet material in polarized light may also be employed to empirically determine the edge effects set up by stretching. Such examination will bear out the previous statement that the main portion of the sheeting has substantially uniform orientation of the molecules therein, while the orientation of the molecules in the outer edges of the sheeting is varying in character. From this study it will be found that the orientation direction changes gradually throughout a strip along each edge of the sheet material from a position which approaches parallelism with the continuous dimension of the sheet material at an edge to a deviated position which is constantly maintained across the main part of the sheet. Edge strips wherein these changing orientations occur are of several inches in width and are indicated between the dotted lines and the edges of the sheeting shown in Fig. 4, these strips being cut away by the cutting means 29 in processing the sheeting.

The foregoing description has set forth in detail various types of machines as well as their operation and has shown that sheet processed in the manner described will be stretched and may have its molecules oriented. Solutions to several practical problems will now be presented. For example, a solution will be given to the problem of what orientation $\phi$ and axial ratio K may be expected for sheeting processed by any of the machines heretofore described which are set up to have known input and output angles $\alpha$ and $\gamma$ and a known speed ratio $u$. Also a teaching will be supplied to answer the even more practical problem of how to set up a machine to obtain a predetermined orientation $\phi$ and a predetermined axial ratio K, that is to say what input and output angles and what speed ratio should be used to produce these desired results without resorting to the empirical tests or cut-and-try methods set forth. At the same time, no distinction has been made as to whether unstretched sheeting or stretched sheeting is undergoing processing.

Assistance in teaching solutions to the just-noted problems will be obtained from a consideration of the movement of the sheeting through a machine in accordance with its path direction and without regard to the input and output rolls but in relation to its direction of movement in the input and output sections of the apparatus. In such considerations the pressure-applying force and the drawing or tensioning force used to stretch the sheeting are both assumed to act on the sheeting at the same location and along a line which extends across the incoming sheeting and which corresponds to the line of tangency between the input rolls and their belt means and which forms a division between the input and output sections of the apparatus. Under these conditions both the input angle $\alpha$ and the output angle $\gamma$ will be measured from a common line intersected by the paths of movement of the sheeting and not with respect to the line of tangency between the input rolls or any belt means and the line of tangency between the output rolls or any belt means associated therewith. This assumption neglects separation of the input and output rolls.

This treatment leads to simplification and is made possible while assuring accurate analytical results within reasonable tolerance limits due to a number of factors. For example, although the input and output rolls are separated, the tension loading of the sheeting is transmitted to the line of tangency between the input rolls and their associated belts and may be considered as applied at that line. In addition, the separation between the input and output rolls is at most only a matter of inches, the machine of Figs. 1, 2 and 3 producing excellent results with a separation of the input and output rolls by 3¾ inches or less between centers. Furthermore, as previously mentioned, the output angle $\gamma$ may be referred to the position of the input rolls in the machines disclosed in the drawings.

Figure 11:
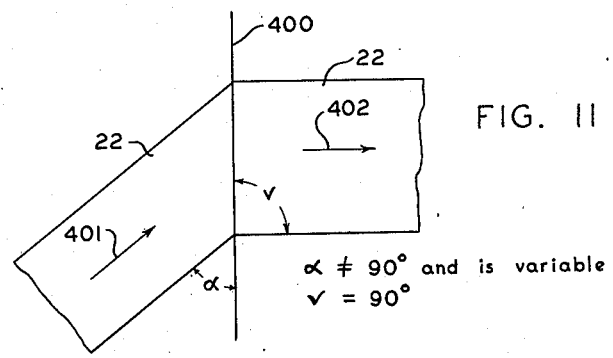
Figs. 11, 12, 13 and 14 are schematic illustrations in plan of possible arrangements of setup for machines of the invention with each figure showing the path direction of movement of sheeting through such a machine and with Figs. 11, 12 and 13 illustrating special cases of machine setup which follow from the general case of machine setup disclosed in Fig. 14.

By way of example, movement of sheeting through the machine of Figs. 1, 2 and 3 with regard to its path direction is schematically represented in Fig. 11. As shown in Fig. 11, sheet 22 is moved in a path direction indicated by the arrow 401 towards a line 400 which extends across the sheeting and which divides the input and output sections of the machine. The line 400 is the common line along which the pressure-applying force and the tensioning load are exerted on the sheeting whereby its direction of movement is changed to follow a path indicated by the arrow 402 as the sheeting is outgoing from the line 400 and is moving in the output section of the machine. In the machine of Figs. 1, 2 and 3 the input angle $\alpha$ is other than 90° but is made variable while the output angle $\gamma$ is substantially maintained at 90° to obtain orientation of the molecules of the sheeting in directions inclined to the longitudinal edges thereof.

Figure 12:
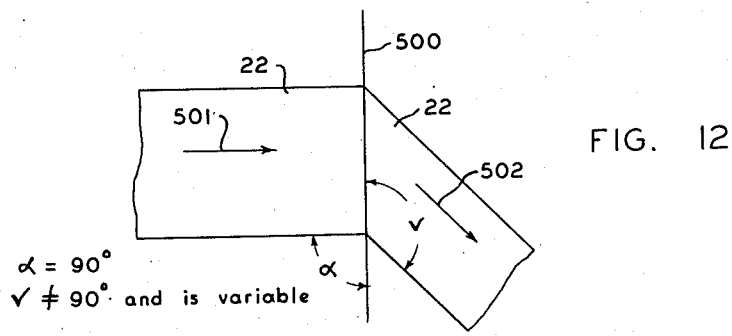

The converse of the sheet movement of Fig. 11 is schematically represented in Fig. 12. In Fig. 12 incoming sheet 22 is moved along a path indicated by the arrow 501 to a line 500 corresponding to the line 400 of Fig. 11 and afterwards is moved along a path in the direction indicated by the arrow 502. In the machine represented in Fig. 12 the input angle $\alpha$ is substantially held constant at 90° while the machine is so constructed that the output angle $\gamma$ may be varied but is never made equal to 90° when stretching sheet materials to obtain molecular orientation in directions angularly disposed to the longitudinal edges thereof. As may be noted, the width of the sheeting is differently altered when processed with the machine setup shown in Figs. 11 and 12. The machine of Fig. 12 illustrates the case wherein the width of the sheeting is decreased by the stretching process as will be evident from an inspection of the drawings.

Figure 13:
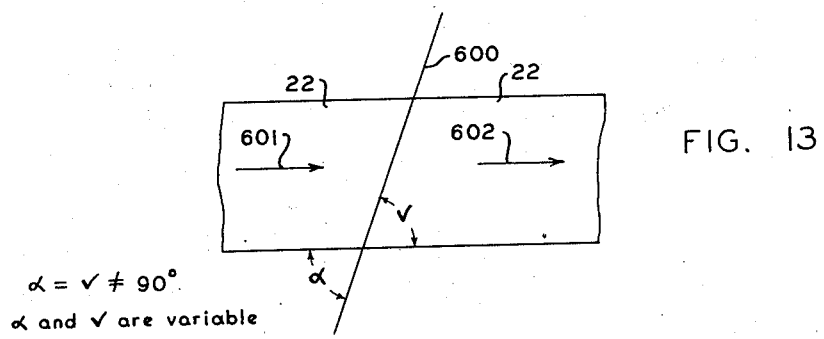

Fig. 13 schematically illustrates sheeting moving in a machine having an input angle $\alpha$ equal to the output angle $\gamma$. In such a machine, sheet 22 is moved in a path direction indicated by the arrow 601 towards a line 600 which extends across the sheeting and which divides the input and output sections of the machine. The line 600 is the common line along which the pressure-applying force and the tensioning load are exerted on the sheeting being processed whereby the direction of movement of the sheeting is caused to follow a path indicated by the arrow 602 as the sheeting is outgoing from the line 600 and is moving in the output section of the machine. As may be observed, the path indicated by the arrow 602 is substantially a continuation without change in direction of the path 601 followed by the incoming sheeting. In the machine of Fig. 13 the input angle $\alpha$ and the output angle $\gamma$ are held at substantially equal values although both angles are adjustably variable except that $\alpha$ and $\gamma$ never individually equal 90°. When sheeting is processed in the manner illustrated in Fig. 13, it may be noted that substantially no alteration in its width dimension takes place.

Figure 14:
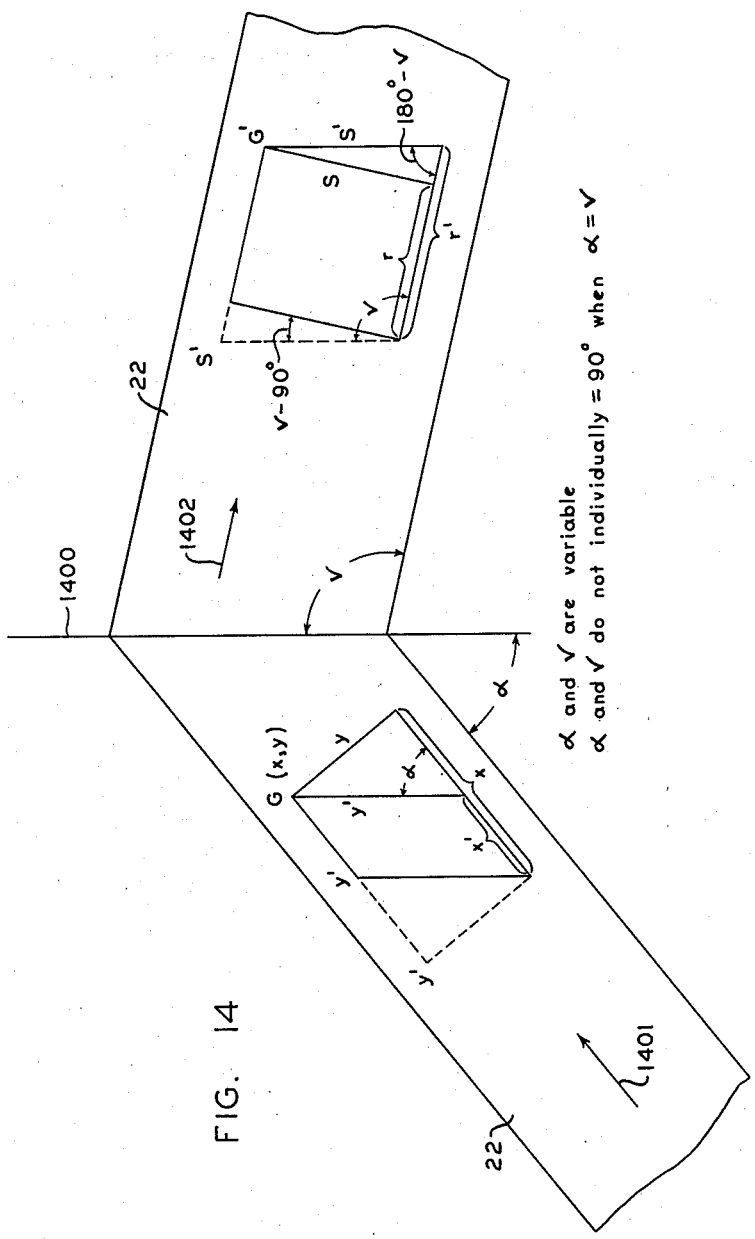

The most general case is disclosed in Fig. 14 which schematically represents movement of sheeting in a machine wherein both the input angle $\alpha$ and the output angle $\gamma$ may be individually varied to have values of other than 90°. The machine represented in Fig. 14 corresponds to the machine of Fig. 10 and as heretofore pointed out may be adjusted to duplicate the conditions illustrated schematically in Figs. 11, 12 and 13. In Fig. 14 incoming sheet 22 moves along a predetermined path 1401 inclined to a line 1400 dividing the input section of the machine from the output section thereof and moves away or is outgoing from the line 1400 along a path having a direction indicated by the arrow 1402.

How the path direction for the movement of sheeting through the input and output sections of stretching apparatus and the speed of such movement affects the sheeting may be understood from a mathematical analysis of the machines of the drawings. This analysis not only teaches solutions to the problems relating to the setup of the machines while taking into consideration the treatment of unstretched as well as stretched material, but also offers proof and an explanation of the operating principles underlying the stretching apparatus and processes forming the subject matter of this invention.

Figure 15:
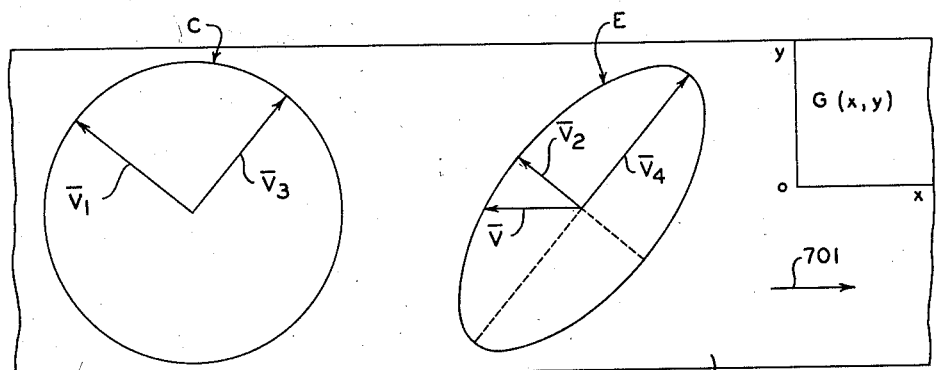
Figs. 15 and 16 are respectively schematic plan views of unprocessed sheeting incoming into a machine of the invention and processed sheeting outgoing from such machine.

As an introduction to the analysis, consider a section of unstretched plastic sheeting which is similar to plastic sheeting heretofore described and which is assumed as a section of continuous sheeting moving through the input section of a machine along a predetermined path with respect to the input rolls. Fig. 15 is a plan view of such a section which is designated by the numeral 122, the path direction of such movement being indicated by the arrow 701. For the sake of analysis, a system of coordinates is illustrated towards the right of the section of sheeting, the $x$-axis of this system being parallel to the longitudinal edge of the sheeting and to the direction of movement. Positive direction on the $x$-axis is in the direction of motion of the sheeting. G is any point on the section 122 of unstretched sheeting.

Stretching may be appropriately analyzed by considering its effects upon certain configurations printed or otherwise marked or formed upon a portion of the section 122 of the plastic sheeting, this practice being similar to that heretofore outlined in connection with the empirical tests. Marked upon the section 122 are a circle C of unit radius and an ellipse E. Circle C has vectors $\overline{V}_1$ and $\overline{V}_3$ originating at the center thereof while the ellipse E has vectors $\overline{V}$, $\overline{V}_2$ and $\overline{V}_4$ originating at its center. $\overline{V}_4$ and $\overline{V}_2$ represent the semi-axes of the ellipse E and with their dotted line continuations form respectively the major and minor axes of the ellipse.

Figure 16:
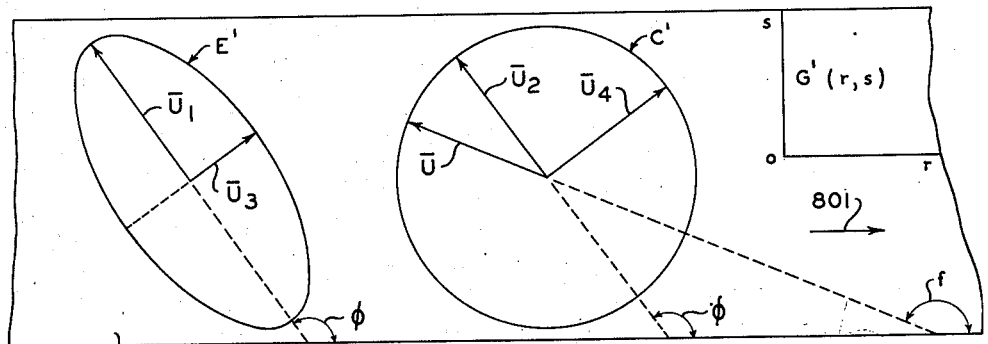

Fig. 16 shows a section of sheeting 822 which corresponds to section 722 of Fig. 15 after stretching has taken place and illustrates the section 822 as moving through the output section of the machine in a predetermined path which is angularly related in the path followed by the incoming sheeting in the input section. The direction of motion of the section 822 is indicated by the arrow 801. A system of coordinates $(r, s)$ is shown at the right of Fig. 16 to assist explanation, the $r$-axis being taken as parallel to the direction of motion and also to the edge of the sheeting and positive direction on the $r$-axis being in the direction of such motion. G' is the point on the section 822 of stretched sheeting which corresponds to point G in Fig. 15. Configurations are shown on the stretched section of the sheeting 822 comprising an ellipse E' and a circle C'. The ellipse E' has vectors $\overline{U}_1$, $\overline{U}_3$ originating at the center thereof and the circle C' has vectors $\overline{U}$, $\overline{U}_2$ and $\overline{U}_4$ originating at its center. Vector $\overline{U}_1$ representing the semi-major axis of the ellipse E' is continued in dotted line to intersect an edge of the sheet as is also the case of the vector $\overline{U}_2$, both forming an angle $\phi$ with the edge of the sheet. The vector $\overline{U}$ is also continued in dotted lines to intersect the edge of the sheet and forms an angle $f$ therewith. $\overline{U}_3$ represents the semi-minor axis of the ellipse E' and with its dotted line continuation represents the minor axis of that ellipse.

The configurations of Fig. 16 are formed from stretching the section of sheeting 722 and are the resulting transformations of the configurations of Fig. 15 into those of Fig. 16. As heretofore noted the circle C of Fig. 15 is any circle of unit radius. Some ellipses having a certain axial ratio and a major axis making a certain angle with the $x$-axis of Fig. 15 will each be transformed into a circle by the stretching of the sheeting. The configuration E of Fig. 15 represents such an ellipse and it is transformed into the unit circle C' of Fig. 16. On the other hand the circle C of Fig. 15 will be transformed into some ellipse upon stretching the section 722 and E' represents such an ellipse.

In Fig. 16 the inclination of the major axis of the ellipse E' relative to the $r$-axis is called the orientation of the stretched sheet and is indicated by the angle $\phi$. The ratio of the major axis to the minor axis of the ellipse E' is called the axial ratio of the stretched sheet.

Let the linear transformation that carries the configurations of Fig. 15 into the configurations of Fig. 16 be:

$$r = n_1 x + n_4 y \quad (1)$$
$$s = n_3 x + n_2 y \quad (2)$$

Let this transformation be indicated by the following matrix:

$$N = \begin{pmatrix} n_1 & n_4 \\ n_3 & n_2 \end{pmatrix} \quad (3)$$

Let the inverse transformation be:

$$x = m_1 r + m_4 s \quad (4)$$
$$y = m_3 r + m_2 s \quad (5)$$

Let the matrix for this transformation be:

$$M = \begin{pmatrix} m_1 & m_4 \\ m_3 & m_2 \end{pmatrix} \quad (6)$$

Let the vector $\overline{U}$ be represented by:

$$\overline{U} = \begin{pmatrix} \cos f \\ \sin f \end{pmatrix} \quad (7)$$

where $\cos f$ indicates the $r$ component and $\sin f$ the $s$ component of $\overline{U}$. The magnitude is taken as unity for simplicity.

In presenting this analysis certain notations and definitions will occur at frequent intervals. To assist in explanation, a list of these follows, certain of the definitions and notations which have been heretofore given being repeated at this point for the sake of grouping them together.

$x$-axis—axis parallel to edge of sheeting before stretching
$y$-axis—axis perpendicular to $x$-axis
$r$-axis—axis parallel to edge of sheeting after stretching
$s$-axis—axis perpendicular to $r$-axis
$\overline{V}$—a vector in sheeting before stretching
$\overline{U}$—a vector in sheeting after stretching (i. e. the transform to $\overline{V}$)
C—a unit circle in sheeting before stretching
E'—the transform of C
C'—a unit circle in sheeting after stretching
E—the ellipse which is transformed into C'
$\overline{U}_1$—semi-major axis of E'
$\overline{V}_1$—the vector that is transformed into $\overline{U}_1$
$\overline{U}_3$—semi-minor axis of E'
$\overline{V}_3$—the vector that is transformed into $\overline{U}_3$
$\overline{V}_4$—the semi-major axis of E
$\overline{U}_4$—the transform of $\overline{V}_4$
$\overline{V}_2$—the semi-minor axis of E
$\overline{U}_2$—the transform of $\overline{V}_2$
N—matrix of transformation carrying $\overline{V}$ into $\overline{U}$
M—matrix of transformation carrying $\overline{U}$ into $\overline{V}$
$n_i$—elements of N
$m_i$—elements of M
U—the absolute value of $\overline{U}$
V—the absolute value of $\overline{V}$
$f$—the inclination (with respect to $r$-axis) of $\overline{U}$
$\phi$—the inclination (with respect to $r$-axis) of $\overline{U}_1$, this corresponding to the orientation angle
K—ratio of major axis of E' to the minor axis and previously noted as the axial ratio
$\alpha$—the input angle
$\gamma$—the output angle
$u$—the ratio of the outgoing speed of sheeting to the incoming speed.

$$a = \tfrac{1}{2}(m_1^2 + m_2^2 + m_3^2 + m_4^2) \quad (8)$$
$$b = \tfrac{1}{2}(m_1^2 - m_2^2 + m_3^2 - m_4^2) \quad (9)$$
$$c = m_1 m_4 + m_2 m_3 \quad (10)$$
$$\det M = m_1 m_2 - m_3 m_4 \quad (11)$$

In Equations 8, 9, 10 and 11 which define $a$, $b$, $c$ and det M respectively, the $m_i$'s are functions of $\alpha$, $\gamma$ and $u$.

With reference to Figs 15 and 16, if $\overline{V}_2$ is parallel to $\overline{V}_1$, then $\overline{U}_2$ is parallel to $\overline{U}_1$, since vectors parallel to $\overline{V}_1$ will have maximum increase in length.

The axial ratio of E and E' are equal.

Proof: $U_1 = k_1 V_1$, $U_2 = k_1 V_2$, $U_3 = k_2 V_3$, $U_4 = k_2 V_4$ $$\frac{U_1}{U_3} = \frac{k_1}{k_2}\frac{V_1}{V_3}, \frac{V_4}{V_2} = \frac{k_1}{k_2}\frac{U_4}{U_2}$$

Since $$\frac{V_1}{V_3} = \frac{U_4}{U_2} = 1$$

then $$\frac{U_1}{U_3} = \frac{V_4}{V_2}$$

Thus, the inclination of $\overline{U}_2$ and the axial ratio of E give the orientation of E' and its axial ratio.

This is the method used herein, i. e., the inclination of $\overline{U}_2$ is called the orientation $\phi$ of the stretched sheet; and the axial ratio of E is called the axial ratio K of the stretched sheet. A result of this practice is to simplify procedure since it permits $\phi$ to be solved for directly.

$$\tan 2\phi = \frac{c}{b} \qquad (12)$$

where $\phi$ is selected so that $b \sec 2\phi < 0$ as will subsequently appear.

Proof: let $$\overline{U} = \begin{pmatrix} \cos f \\ \sin f \end{pmatrix} \qquad (13)$$

and let $$M = \begin{pmatrix} m_1 & m_4 \\ m_3 & m_2 \end{pmatrix} \qquad (14)$$

$$\overline{V} = M\overline{U} = \begin{pmatrix} m_1 \cos f + m_4 \sin f \\ m_3 \cos f + m_2 \sin f \end{pmatrix} \qquad (15)$$

$$V^2 = (m_1 \cos f + m_4 \sin f)^2 + (m_3 \cos f + m_2 \sin f)^2 \qquad (16)$$

$$= a + b \cos 2f + c \sin 2f \qquad (17)$$

Differentiating Equation 17 with respect to $f$ and equating $$\frac{dV}{df}$$

to 0 to find the semi-major and semi-minor axis $V_4$ and $V_2$ of the ellipse E, $$\tan 2\phi = \frac{c}{b}$$

is obtained where the resulting two values of $\phi$ are the inclinations of $\overline{U}_4$ and $\overline{U}_2$.

The axial ratio is given by:

$$K^2 = \frac{V_4{}^2}{V_2{}^2} = \frac{a - b \sec 2\phi}{a + b \sec 2\phi} = \frac{a + \sqrt{b^2 + c^2}}{a - \sqrt{b^2 + c^2}} = \frac{a + \sqrt{a^2 - (\det M)^2}}{a - \sqrt{a^2 - (\det M)^2}} \qquad (18)$$

Proof: From Equation 17

$$V_2{}^2 = a + b \cos 2\phi + c \sin 2\phi \qquad (19)$$

and $V_4{}^2 = a + b \cos 2(\phi - 90°) + c \sin 2(\phi - 90°)$ (20)

Substituting $$c = b \tan 2\phi = b \tan 2(\phi - 90°)$$

in Equations 19 and 20:

$$V_2{}^2 = a + b \sec 2\phi \qquad (21)$$

$$V_4{}^2 = a - b \sec 2\phi \qquad (22)$$

from which it follows that $$K^2 = \frac{a - b \sec 2\phi}{a + b \sec 2\phi} \qquad (23)$$

$a$ is always positive from its definition in Equation 8 and in order for $\overline{V}_4$ to be the semi-major axis, the sign of $\sec 2\phi$ must be opposite to the sign of $b$.

The remainder of the expressions in Equation 18 may be developed by using Equations 11 and 12 in Equation 23. The ratio of the area of the stretched sheet to the original sheet is $(\det M)^{-1}$, subsequently referred to in connection with the area condition, since Area of $C' = \pi$ square units Area of $E =$ $\pi V_2 V_4 = \pi (a - \sqrt{a^2 - (\det M)^2})^{\frac{1}{2}} (a + \sqrt{a^2 + (\det M)^2})^{\frac{1}{2}}$ $= \pi(\det M)$ $$\frac{\text{Area of } C'}{\text{Area of } E} = (\det M)^{-1} \qquad (24)$$

The foregoing portion of this analysis has been used to develop mathematical equations for use in solving the hitherto-mentioned problems relating to the setup of the machines of the invention applicable for the processing of unstretched or stretched sheeting.

The first problem taken up is one involving the processing of unstretched or unoriented sheeting and wherein it is desired to find the orientation $\phi$ and axial ratio K resulting from treatment in a single machine having known input and output angles $\alpha$ and $\gamma$ and speed ratio $u$, it being here pointed out that unless otherwise noted, reference will hereafter be had to the processing of sheet material initially in an unstretched or unoriented condition by a single machine.

A solution to the first problem may be derived in the following manner.

Find inverse transformation $$x = m_1 r + m_4 s$$

$$y = m_3 r + m_2 s$$

Set up matrix $$M = \begin{pmatrix} m_1 & m_4 \\ m_3 & m_2 \end{pmatrix}$$

Find $a$, $b$ and $c$ as in Equations 8, 9 and 10.

Find $$\tan 2\phi = \frac{c}{b} \qquad (12)$$

where $\sec 2\phi$ has sign opposite to sign of $b$.

Find $$K^2 = \frac{a + \sqrt{b^2 + c^2}}{a - \sqrt{b^2 + c^2}}$$

from Equation 18.

To find the orientation and axial ratio resulting from stretching initially unoriented sheet material, only the matrix M which represents the inverse transformation need be known. The inverse matrix may be easily evaluated with reference to Fig. 14 wherein two coordinate systems $(x, y)$ and $(r, s)$, like those described in connection with Figs. 15 and 16 are shown. Intermediary axes $(x', y')$ and $(r', s')$ are used to simplify the procedure in going from $(x, y)$ coordinates to $(r, s)$ coordinates. $x'$ coincides with $x$, and $r'$ coincides with $r$, and $y'$ and $s'$ are both parallel to the line 1400 which marks the division between the input and output sections of the machine shown in Fig. 14.

$$x = x' + y' \cos \alpha$$

$$y = y' \sin \alpha$$

$$y' = s'$$

$$x' = \frac{1}{u} r'$$

$$s' = s \csc \gamma$$

$$r' = r - s \cot \gamma$$

By substitution $$x = \left(\frac{1}{u}\right) r + \left(\csc \gamma \cos \alpha - \frac{1}{u} \cot \gamma\right) s$$

$$y = (0) r + (\csc \gamma \sin \alpha) s$$

Thus $$M = \begin{pmatrix} \frac{1}{u} & \csc \gamma \cos \alpha - \frac{1}{u} \cot \gamma \\ 0 & \csc \gamma \sin \alpha \end{pmatrix} \qquad (25)$$

The elements of the inverse matrix are:

$$m_1 = \frac{1}{u}, \quad m_2 = \csc \gamma \sin \alpha, \quad m_3 = 0,$$

$$m_4 = \csc \gamma \cos \alpha - \frac{1}{u} \cot \gamma \quad (25a)$$

It is more useful to know $a$, $b$ and $c$ in terms of $\alpha$, $\gamma$, and $u$ rather than in terms of the $m_i$'s. These are:

$$a = \frac{\csc^2 \gamma}{2u^2}(u^2 - 2u \cos \alpha \cos \gamma + 1) \quad (26)$$

$$b = \frac{\csc^2 \gamma}{2u^2}(-u^2 + 2u \cos \alpha \cos \gamma - \cos 2\gamma) \quad (27)$$

$$c = \frac{\csc \gamma}{u^2}(u \cos \alpha - \cos \gamma) \quad (28)$$

The orientation of the stretched sheet is given by:

$$\tan 2\phi = \frac{2 \sin \gamma (u \cos \alpha - \cos \gamma)}{-u^2 + 2u \cos \alpha \cos \gamma - \cos 2\gamma} \quad (29)$$

The axial ratio of the stretched sheet is given by:

$$K^2 = \frac{1 + u^2 - 2u \cos \alpha \cos \gamma + \sqrt{u^4 + 1 - 4u \cos \alpha \cos \gamma (u^2 + 1) + 4u^2 \cos^2 \alpha + 2u^2 \cos 2\gamma}}{1 + u^2 - 2u \cos \alpha \cos \gamma - \sqrt{u^4 + 1 - 4u \cos \alpha \cos \gamma (u^2 + 1) + 4u^2 \cos^2 \alpha + 2u^2 \cos 2\gamma}} \quad (30)$$

It has been previously stated that two or more machines of the type disclosed in Figs. 1, 2 and 3 or in Fig. 10 may be arranged in tandem whereby the first machine processes initially unstretched sheet material which on stretching is fed directly to and received by the input section of a second machine wherein it is subjected to further stretch processing following which, if desired, it may be fed to still another machine. A schematic representation in plan showing the movement of the sheeting through two machines arranged in tandem or series is disclosed in Fig. 17. Machine #1 and machine #2 of Fig. 17 may be similar to the machine of Fig. 10 and are arranged so that the output section of machine #1 is aligned with the input section of machine #2 whereby sheeting from the output section of machine #1 is fed to the input section of machine #2.

Figure 17:
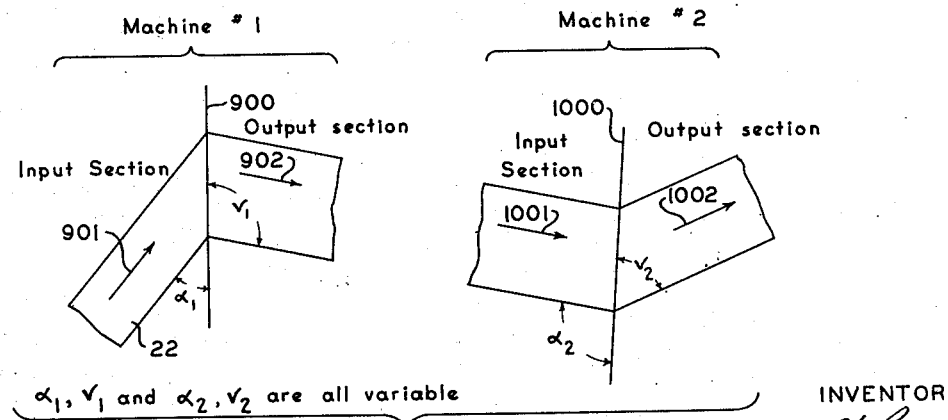
Fig. 17 is a schematic plan view of a plurality of machines of the character of the machine of Figs. 10 and 14 arranged in series and showing the path direction followed by sheeting in movement therethrough.

Machine #1 and machine #2 are disclosed in similar manner to the schematic showing of Fig. 14 and both machines are constructed so that the input and output angles thereof may be varied. In Fig. 17, incoming sheet 22 moves along a predetermined path indicated by the arrow 901. This path is inclined to a line 900 dividing the input section of the first machine from the output section thereof. Sheeting which is outgoing from the line 900 follows a path having a direction indicated by the arrow 902. The incoming sheet material for the second machine of Fig. 17 moves along a path indicated by the arrow 1001 which will generally be a continuation of the path 902. The path indicated by the arrow 1001 is inclined to a dividing line 1000 which divides the input section from the output section of the second machine. A path indicated by the arrow 1002 is followed by the sheeting in its movement through the output section of the second machine.

The input and output angles for the first machine are $\alpha_1$ and $\gamma_1$ and those for the second machine are $\alpha_2$ and $\gamma_2$. The speed ratio for the first machine is $u_1$ and that for the second machine is $u_2$ but with the input speed of the second machine equal to the output speed of the first machine. The first and second machines of Fig. 17 may be so arranged with respect to each other that the dividing lines 900 and 1000 are substantially parallel in which case the input angle $\alpha_2$ will equal the supplement of the output angle $\gamma_1$. This is the equivalent of saying that the axes of the input rolls of the second machine are parallel to the axes of the output rolls of the first machine. Such a condition is not essential and for that reason the second machine of Fig. 17 is shown as arranged to have the dividing line 1000 thereof inclined to line 900 or in other words so that the roll axes of the output rolls of the first machine and the axes of the input rolls of the second machine are in angular relation to each other. In this latter case the input angle $\alpha_2$ will not be equal to the supplement of the output angle $\gamma_1$.

The solution to the problem involving the processing of initially unstretched or unoriented sheeting which successively passes through a plurality of machines arranged in tandem or series and wherein it is desired to find the orientation $\phi$ and the axial ratio $K$ imparted to the sheeting on its discharge from the last machine in the series may be derived in the following manner.

For two machines in series when $\alpha_1$, $\gamma_1$ and $u_1$, and $\alpha_2$, $\gamma_2$ and $u_2$ are known, the matrix $M$ will be:

$$M = M_1 M_2 =$$

$$\begin{pmatrix} \frac{1}{u_1} & \csc \gamma_1 \cos \alpha_1 - \frac{1}{u_1} \cot \gamma_1 \\ 0 & \csc \gamma_1 \sin \alpha_1 \end{pmatrix} \begin{pmatrix} \frac{1}{u_2} & \csc \gamma_2 \cos \alpha_2 - \frac{1}{u_2} \cot \gamma_2 \\ 0 & \csc \gamma_2 \sin \alpha_2 \end{pmatrix} \quad (31)$$

From which it follows that the elements of $M$ for two machines in series are:

$$m_1 = \frac{1}{u_1 u_2}, \quad m_2 = \csc \gamma_1 \sin \alpha_1 \csc \gamma_2 \sin \alpha_2, \quad m_3 = 0$$

$$m_4 = \frac{1}{u_1} \csc \gamma_2 \cos \alpha_2 - \frac{1}{u_1 u_2} \cot \gamma_2 + \csc \gamma_1 \cos \alpha_1 \csc \gamma_2 \sin \alpha_2 - \frac{1}{u_1} \cot \gamma_1 \csc \gamma_2 \sin \alpha_2 \quad (31a)$$

By using these just-found values of $m_i$ in Equations 8, 9 and 10, the orientation $\phi$ and the axial ratio $K$ imparted to initially unstretched or unoriented sheeting by passing it successively through two machines in series may be found through the use of practices similar to those employed for obtaining Equations 29 and 30.

While the results for two machines in series have been evaluated, it is to be understood that a greater number of machines in series may be employed. For $n$ machines in series, where $n$ represents any integer greater than 1, the matrix for the inverse transformation is $$M = M_1 \cdot M_2 \cdots M_n$$

The solution to the problem of how to set up a machine to process unstretched or unoriented sheeting whereby to obtain predetermined values of $\phi$ and $K$ has not as yet been presented. This involves finding values for $\alpha$, $\gamma$ and $u$ which may be used for the machine in producing processed sheet having the desired orientation and axial ratio. In solving this problem it is necessary to consider a physical limitation to the mathematical equations, namely that the area of the stretched sheet must be at least equal to the area of the incoming sheet. This limitation has been previously referred to and has been called the area condition. Mathematically it is designated as $$u \geq \csc \gamma \sin \alpha \quad (32)$$

This inequality is derived from Equation 24 as follows:

$$\det M = m_1 m_2 - m_3 m_4 = \frac{1}{u} \csc \gamma \sin \alpha$$

$$(\det M)^{-1} = u \sin \gamma \csc \alpha$$

from which $$u \sin \gamma \csc \alpha \geq 1$$

Thus $$u \geq \sin \alpha \csc \gamma$$

To set up the machine to satisfy the area condition for a predetermined $\phi$ and $K$, the $\alpha$ and $\gamma$ being adjustable as in the general case illustrated by Fig. 14.

For $\phi \neq 45°, 135°$

Select $\gamma$ so that $\tan 2\phi \neq \tan \gamma$ and $$\cos 2\gamma \begin{cases} \leq R, \text{ if } \sec 2\phi > 0 \\ \geq R, \text{ if } \sec 2\phi < 0 \end{cases}$$

and also so that $$\cos 2\gamma \geq P, \cos 2\gamma \geq Q$$

or so that $$\cos 2\gamma \leq P, \cos 2\gamma \leq Q$$

where $$R = \frac{K-1}{K+1} \sec 2\phi, \quad P = \frac{K-1-2\sqrt{K} \tan 2\phi}{(K+1) \sec 2\phi}$$

and $$Q = \frac{K-1+2\sqrt{K} \tan 2\phi}{(K+1) \sec 2\phi}$$

$\gamma$ having been selected to satisfy the just-foregoing, $u$ and $\alpha$ may be found as follows:

$$u^2 = \frac{(K^2+1) \sec 2\phi + (K^2-1)(-\sin 2\gamma \tan 2\phi - \cos 2\gamma)}{(K^2+1) \sec 2\phi - (K^2-1)} \quad (33)$$

$$\cos \alpha = \frac{u^2 \tan 2\phi + \tan 2\phi \cos 2\gamma - \sin 2\gamma}{2u \cos \gamma (\tan 2\phi - \tan \gamma)} \quad (34)$$

Equations 33 and 34 may be derived from certain of the foregoing equations, principally from Equations 23 and 29.

For $\phi = 45°$ or $135°$, for the general case, to find $\alpha$, $\gamma$, and $u$, proceed as follows:

Select $\gamma$ so that $$\sin 2\gamma \begin{cases} \geq \frac{1-K}{1+K}, \text{ when } \phi = 135° \\ \leq \frac{K-1}{K+1}, \text{ when } \phi = 45° \end{cases}$$

Having selected $\gamma$, values for $u$ and $\alpha$ may be found from the following:

$$u^2 = \begin{cases} \frac{(K^2+1) - (K^2-1) \sin 2\gamma}{K^2+1}, \text{ when } \phi = 45° \quad (35) \\ \frac{(K^2+1) + (K^2-1) \sin 2\gamma}{K^2+1}, \text{ when } \phi = 135° \quad (36) \end{cases}$$

$$\cos \alpha = \frac{u^2 + \cos 2\gamma}{2u \cos \gamma} \quad (37)$$

Having considered the general case wherein $\alpha$ and $\gamma$ are variably adjustable, the various special cases wherein $\alpha$ and/or $\gamma$ are held to a substantially constant value will now be taken up.

With reference to Fig 11, solutions will be presented to the problems involved in connection with a machine in which the input angle $\alpha$ is variable while the output angle $\gamma$ is held at 90°.

In the case of a single machine of the type illustrated by Fig. 11 which is processing initially unstretched or unoriented sheeting the matrix (25) becomes $$M = \begin{pmatrix} \frac{1}{u} & \cos \alpha \\ 0 & \sin \alpha \end{pmatrix} \quad (38)$$

$a$, $b$, and $c$ in Equations 26, 27 and 28 become $$a = \frac{u^2+1}{2u^2}$$

$$b = \frac{1-u^2}{2u^2}$$

$$c = \frac{\cos \alpha}{u}$$

The orientation when $\alpha$ and $u$ are known where $\gamma$ is 90° is given by:

$$\tan 2\phi = \frac{2u \cos \alpha}{1-u^2} \quad (39)$$

The axial ratio when $\alpha$ and $u$ are known where $\gamma$ is 90° is given by:

$$K^2 = \frac{1+u^2+\sqrt{u^4+1+2u^2 \cos 2\alpha}}{1+u^2-\sqrt{u^4+1+2u^2 \cos 2\alpha}} \quad (40)$$

The area condition in the case where $\gamma$ is 90° is given by $$u \geq \sin \alpha$$

To set up the machine to obtain predetermined values for $\phi$ and $K$ in the case where $\gamma$ is held to substantially 90°, from Equations 33 and 34:

For the situation where $\phi \neq 45°, 135°$, $$u^2 = \frac{(K^2+1) \sec 2\phi + (K^2-1)}{(K^2+1) \sec 2\phi - (K^2-1)} \quad (41)$$

and $$\cos \alpha = \frac{\tan 2\phi (1-u^2)}{2u} \quad (42)$$

and for $\phi = 45°, 135°$ $$u = 1$$

as it is evident from Equation 39, and $$0 < \alpha < 90° \text{ for } \phi = 135°$$

$$90° < \alpha < 180° \text{ for } \phi = 45°$$

and as derived from Equation 40

$$K = \cot \frac{\alpha}{2}, \text{ if } 0 < \alpha < 90° \text{ for } \phi = 135°$$

$$K = \tan \frac{\alpha}{2}, \text{ if } 90° < \alpha < 180° \text{ for } \phi = 45°$$

Two machines of the type illustrated by Fig. 11 may be arranged in series similar to the manner disclosed in connection with the two machines of Fig 17. When this series arrangement is carried out, unstretched or unoriented sheeting entering the first machine is discharged therefrom at an output angle $\gamma_1$ of 90° and is received by the second machine which also has an output angle $\gamma_2$ of 90°.

For two machines in series with $\gamma_1 = \gamma_2 = 90°$, the elements of the matrix M which is employed in solving this problem may be derived from expression (31a) and are as follows:

$$m_1 = \frac{1}{u_1 u_2}, \quad m_2 = \sin \alpha_1 \sin \alpha_2, \quad m_3 = 0$$
$$m_4 = \frac{1}{u_1} \cos \alpha_2 + \cos \alpha_1 \sin \alpha_2 \qquad (43)$$

By using the values for the $m_i$'s found in (43) in Equations 8, 9 and 10 the orientation $\phi$ and the axial ratio K given to initially unstretched or unoriented sheeting by successively processing it in two machines, may be found through the use of practices similar to those employed for obtaining Equations 29 and 30.

While only two machines have been here considered for the purpose of illustrating a plurality of machines in series it will be understood that a greater number of machines may be so employed. In the latter event procedure similar to that heretofore indicated for solving such a problem may be followed.

The next special case is that illustrated by Fig. 12 for a machine in which the input angle $\alpha$ is held substantially constant and at a value of 90° while the output angle $\gamma$ is made adjustable. In the case of a single machine wherein the input angle is substantially maintained at 90° and which is processing initially unstretched or unoriented sheet, the elements of the inverse matrix are $$m_1 = \frac{1}{u}, \quad m_2 = \csc \gamma, \quad m_3 = 0, \quad m_4 = -\frac{1}{u} \cot \gamma \quad (44)$$

$a$, $b$, and $c$ in Equations 26, 27 and 28 become $$a = \frac{\csc^2 \gamma}{2u^2}(u^2 + 1)$$

$$b = \frac{\csc^2 \gamma}{2u^2}(-u^2 - \cos 2\gamma)$$

$$c = \frac{-\cot \gamma}{u^2}$$

The orientation is given by:

$$\tan 2\phi = \frac{\sin 2\gamma}{u^2 + \cos 2\gamma} \qquad (45)$$

The axial ratio is given by:

$$K^2 = \frac{1 + u^2 + \sqrt{u^4 + 2u \cos 2\gamma + 1}}{1 + u^2 - \sqrt{u^4 + 2u \cos 2\gamma + 1}} \qquad (46)$$

The area condition for a single machine having an input angle of 90° is $$u \geq \csc \gamma$$

from which the setup for $\gamma$ and $u$ required to provide certain predetermined orientations and axial ratios may be obtained.

Two machines of the type illustrated in Fig. 12 may be arranged in series similar to the manner already disclosed in connection with Fig. 17. When such a series arrangement is carried out, unstretched or unoriented sheeting will enter the first machine at an input angle $\alpha_1$ of 90° and sheeting discharged from the first machine will enter the second machine at an input angle $\alpha_2$ of 90°.

For two machines in series with $\alpha_1 = \alpha_2 = 90°$, the elements of the matrix which is employed will be found to be:

$$m_1 = \frac{1}{u_1 u_2}, \quad m_2 = \csc \gamma_1 \csc \gamma_2, \quad m_3 = 0$$
$$m_4 = -\frac{1}{u_1 u_2} \cot \gamma_2 - \frac{1}{u_1} \cot \gamma_1 \csc \gamma_2 \qquad (47)$$

If the values for the $m_i$'s in expression (47) are used in Equations 8, 9 and 10, the orientation $\phi$ and the axial ratio K imparted to initially unstretched or unoriented sheeting by successive processing may be found through the use of practices similar to those employed for obtaining Equations 29 and 30.

As in previous cases, two machines only have been here specifically discussed by way of illustrating a solution to the problem analyzed for a plurality of machines in series it being apparent that the solution may be extended to comprehend a greater number of machines in series arrangement.

With reference to Fig. 13, the special case when $\alpha = \gamma \neq 90°$ will here be considered.

When $\alpha = \gamma \neq 90°$, the elements of the inverse matrix for the processing of initially unstretched or unoriented sheeting by a single machine are:

$$m_1 = \frac{1}{u}, \quad m_2 = 1, \quad m_3 = 0, \quad m_4 = \cot \alpha \left( \frac{u-1}{u} \right) \quad (48)$$

$a$, $b$, and $c$ in Equations 26, 27 and 28 become $$a = \frac{\csc^2 \alpha}{2u^2}(u^2 - 2u \cos^2 \alpha + 1)$$

$$b = \frac{\csc^2 \alpha}{2u^2}(-u^2 + 2u \cos^2 \alpha - \cos 2\alpha)$$

$$c = \frac{\cot \alpha}{u^2}(u-1)$$

In this case where $\alpha$ and $\gamma$ and $u$ are known and $\alpha = \gamma$ the orientation is given by $$\tan 2\phi = \frac{\sin 2\alpha}{\cos 2\alpha - u} \qquad (49)$$

and the axial ratio is given by $$K^2 = \frac{u^2 - 2u \cos^2 \alpha + 1 + \sqrt{(u^2-1)^2 + (u-1)^2 4u \cos^2 \alpha}}{u^2 - 2u \cos^2 \alpha + 1 - \sqrt{(u^2-1)^2 + (u-1)^2 4u \cos^2 \alpha}}$$
$$(50)$$

To satisfy the area condition for the case where $\alpha = \gamma \neq 90°$, $u$ must be greater than or equal to 1. After satisfaction of the area condition, the setup for the machine to provide certain predetermined orientations and axial ratios may be obtained.

Also for this special case of $\alpha = \gamma \neq 90°$, a matrix for several machines in series may be found and the elements thereof made use of in treatment similar to that described for finding the $\phi$ and K imparted to initially unstretched or unoriented sheeting processed successively by several machines.

Only the effect on sheeting in an initially unstretched or unoriented condition has as yet been considered in connection with processing carried out by a single machine. In some instances it may be desirable to reprocess already stretched sheeting having a known orientation $\phi_0$ and a known axial ratio $K_0$ whereby to impart to it a different orientation, designated by $\phi$, and a different axial ratio, designated by K. It is possible to derive equations which will predetermine the orientation $\phi$ and the axial ratio K resulting from stretching sheeting having an orientation $\phi_0$ and an axial ratio $K_0$ in a single machine having given values for $\alpha$, $\gamma$ and $u$. Basic Equations 12 and 18 may be effectively employed in reaching a solution to this problem by resorting to an assumption about the already processed sheeting, this assumption in no way detracting from the generality of the solution. This assumption is that the oriented sheet is first passed through a stretching machine to completely unorient it. Three conditions are treated, namely, when $\phi_0 \neq 45°$, $135°$, when $\phi_0=45°$, and when $\phi_0=135°$. On the basis of the just-noted assumption:

A. When $\phi_0 \neq 45°$, $135°$, define $$u_1^2 = \frac{K_0^2 \sec 2\phi_0 + \sec 2\phi_0 - K_0^2 + 1}{K_0^2 \sec 2\phi_0 + \sec 2\phi_0 + K_0^2 - 1}; \text{ take } u_1 > 0 \quad (51)$$

$$\cos B = \frac{\tan 2\phi_0 (u_1^2 - 1)}{2u_1}; \text{ select } 0° < B < 180° \quad (52)$$

The elements of the inverse matrix become $$m_1 = \frac{u_1}{u}, \; m_2 = \sin B \csc \gamma \sin \alpha, \; m_3 = 0$$
$$m_4 = u_1 \csc \gamma \cos \alpha - \frac{u_1}{u} \cot \gamma + \cos B \csc \gamma \sin \alpha$$
$$(53)$$

By following the previously defined procedure, $\tan 2\phi$ and $K^2$ may be found.

B. Similarly, when $\phi_0 = 45°$, define $$u_1 = 1$$
$$\tan \frac{B}{2} = K_0$$

instead of by the values in expressions (51) and (52).

By then proceeding as in condition A, $\tan 2\phi$ and $K^2$ may be found.

C. Also similarly, when $\phi_0 = 135°$ define $$u_1 = 1$$
$$\cot \frac{B}{2} = K_0$$

Tan $2\phi$ and $K^2$ may be found from this in the manner indicated in conditions A and B.

Of interest is the fact that if unoriented sheeting is considered as treated by the reprocessing procedure just described, $u_1$ will be defined as 1 and B as 90° in order to apply the expressions 53 for the elements of the inverse matrix. Through the use of such definitions of $u_1$ and B, Equations 29 and 30 are reobtained.

Reference has heretofore been made to uniplanar orientation which has been defined as orientation of the molecules of sheet materials so that the long axis of each molecule is substantially parallel to the plane which passes through the length and breadth dimensions of the sheet and whereby the long axes of the molecules are otherwise heterogeneously arranged with respect to each other. Uniplanar orientation results in an increase of the area of the sheet material through an increase of its length and breadth dimensions by substantially equal amounts. Thus, a circle printed on unstretched sheeting will remain a circle when the sheeting is stretched to obtain uniplanar orientation but the area of the circle will be increased $n$ times, where $n$ has a value always greater than one. Since the circle is unchanged as to geometric form, sheeting having uniplanar orientation has an axial ratio K equal to one and since the molecules of such sheeting are located at random with respect to an axis lying in the plane of the length and breadth dimensions, the orientation $\phi$ may be dropped from consideration or $\phi$ may be thought of as replaced by $n$.

One practice for obtaining uniplanar orientation makes use of two machines in series, for example, machines of the type illustrated in Fig. 10 or in Figs. 1, 2 and 3 arranged as shown in Fig. 17 and having input and output angles and speed ratios of respectively $\alpha_1$, $\gamma_1$, and $u_1$, and $\alpha_2$, $\gamma_2$, and $u_2$. To obtain uniplanar orientation with two such machines arranged in series whereby to increase the area of the sheet by a desired amount $n$, the following conditions must be satisfied:

Let $$\gamma_1 = \gamma_2 = 90°$$

and $$u_1 = u_2 = \sqrt[4]{n}$$

Select $$\sin \alpha_1 = \frac{1}{u_1} = \frac{1}{u_2}$$

and let $$\alpha_2 = 180° - \alpha_1$$

Since $\alpha$, $\gamma$, and $u$ for each of the machines are known, it will thus be apparent that these conditions will explain how to set up the machines to obtain uniplanar stretch wherein the area is increased by a desired amount $n$.

In regard to the foregoing illustration, it may be noted that since $\alpha_2$ is the supplement of $\alpha_1$, uniplanar stretch may be effected in a single machine set up with an input angle equal to $\alpha_1$ and an output angle equal to 90° by running the sheeting through the machine, removing it after stretching and running it through the machine a second time but with the sheeting rotated 180° about its longitudinal axis. When such practice is followed with the machine of Figs. 1, 2 and 3, the surface of the sheeting which is uppermost during the first run of the sheeting through the machine will be lowermost during the second run of the sheeting through the machine.

It is also possible with the machines of the invention to obtain transverse stretch, that is an orientation wheerin $\phi$ is equal to 90°. One manner of accomplishing this is to make use of two machines in series of the types shown in Fig. 10 or in Figs. 1, 2 and 3. Assuming that some particular axial ratio K is desired, since in this instance $\phi$ will be equal to 90°, the machines must be set up to meet the following conditions:

Let $$\gamma_1 = \gamma_2 = 90°$$

and $$u_1 = u_2 = 1$$

Select $$\cos 2\alpha_2 = -\frac{1}{K^2}$$

and $$\cos \alpha_1 = -\cot \alpha_2$$

When the machines are set up in the manner just described in the foregoing, the transverse or 90° orientation at a desired K will be obtained, it being noted that the values of $\alpha$, $\gamma$, and $u$ selected for the two machines will satisfy the aforementioned area condition.

Mention has been made throughout this disclosure of the processing of sheet material by passing it through a plurality of machines arranged in series as well as the processing of sheet material by passing it through a single machine. It will be appreciated that a cycle of stretching operations is carried out each time sheet material passes through a machine. Broadly speaking, this cycle of operations will comprise the movement of the sheeting along a selected path at a selected speed towards a straight line extending across the path, the discharge of the sheeting across the discharge line while applying a restaining frictional force to the sheeting by applying pressure to the surfaces of the sheeting along the discharge line, and then drawing the sheeting under tension from the discharge line along a second selected path at a second selected speed. Each time the sheeting is passed through a machine whether it is subjected to reprocessing by the same machine or whether it is run through another machine in a series of machines, this cycle of operations is carried out.

A machine setup wherein the input angle α and the output angle γ are each equal to 90° has been excluded in the various cases and machines heretofore described. While in certain of the machines disclosed, for example, in the machine of Figs. 1, 2 and 3, input and output angles each of 90° may be readily obtained, to use such values would result in longitudinal stretch wherein the molecules of the sheeting being processed are oriented substantially in parallelism to the length dimension of the sheeting. The invention is generally unconcerned with longitudinal stretch except as may be incidental in effecting the stretching of sheet materials to obtain an orientation of the molecules thereof in a direction inclined to a longitudinal edge of the material. For example, when several machines are arranged in series it may be advantageous in obtaining a desired end result to adjust one of the machines so that it will orient the molecules of the sheeting in a direction extending lengthwise of the sheeting. However, in such instance the end result obtained is of a character whereby the sheeting is stretched so that its molecules are oriented with respect to an axis which extends across the sheeting and is angularly disposed to the longitudinal edge thereof.

The term "area," as used throughout the specification and claims, with reference to sheet materials or sheeting is intended to mean the surface area thereof.

Since certain changes may be made in the above processes, apparatus and products without departing from the scope of the invention herein involved, it is intended that all matter contained in the above description and shown in the accompanying drawings shall be interpreted as illustrative and not in a limiting sense.

I claim:

1. A machine for stretching sheeting comprising means engaging continuous sheeting for moving it lengthwise of itself along a selected path and discharging it at a substantially straight line which extends across said path and which lies in a predetermined plane, and means engaging and drawing the sheeting from said discharge line without interrupting said movement of the sheeting for moving it lengthwise of itself along a second selected path, the traces of said selected paths when projected into the plane of the discharge line appearing as straight lines which are angularly disposed to said discharge line in a relation wherein the trace of one of said paths is disposed to said discharge line at angles of other than 90°.

2. A machine for stretching sheeting comprising means engaging continuous sheeting for moving it lengthwise of itself along a selected path and discharging it at a substantially straight line which extends across said path and which lies in a predetermined plane, means engaging and drawing the sheeting from said discharge line without interrupting said movement of the sheeting for moving it lengthwise of itself along a second selected path, the traces of said selected paths when projected into the plane of the discharge line appearing as straight lines which are angularly disposed to said discharge line in a relation wherein the trace of one of said paths is disposed to said discharge line at angles of other than 90°, and still other means cooperating with said sheet-moving means for predetermining the rate of movement of said sheeting along said paths.

3. A machine for stretching sheeting comprising means engaging continuous sheeting for moving it lengthwise of itself along a selected path and discharging it at a substantially straight line which extends across said path and which lies in a predetermined plane, means engaging and drawing the sheeting from said discharge line without interrupting said movement of the sheeting for moving it lengthwise of itself along a second selected path, the traces of said selected paths when projected into the plane of the discharge line appearing as straight lines which are angularly disposed to said discharge line in a relation wherein the trace of one of said paths is disposed to said discharge line at angles of other than 90°, and adjustable means cooperating with said sheet-moving means for predeterminedly controlling the position of each of said paths.

4. A machine for stretching sheeting comprising means engaging continuous sheeting for moving it lengthwise of itself along a selected path and discharging it at a substantially straight line which extends across said path and which lies in a predetermined plane, means engaging and drawing the sheeting from said discharge line without interrupting said movement of the sheeting for moving it lengthwise of itself along a second selected path, the traces of said selected paths when projected into the plane of the discharge line appearing as straight lines which are angularly disposed to said discharge line in a relation wherein the trace of one of said paths is disposed to said discharge line at angles of other than 90°, speed control means cooperating with said sheet-moving means for predetermining the rate of movement of said sheeting along said paths, and adjustable means cooperating with said sheet-moving means for selectively varying the path position of at least one of the paths followed by the sheeting as it passes through said machine.

5. A machine for stretching sheeting comprising means engaging continuous sheeting for moving it lengthwise of itself along a selected path and discharging it at a substantially straight line which extends across said path and which lies in a predetermined plane, means engaging and drawing the sheeting from said discharge line without interrupting said movement of the sheeting for moving it lengthwise of itself along a second selected path, the traces of said selected paths when projected into the plane of the discharge line appearing as straight lines which are angularly disposed to said discharge line in a relation wherein the trace of one of said paths is disposed to said discharge line at angles of other than 90°, and sheet-softening means located adjacent said discharge line and acting upon said sheeting undergoing stretching for increasing the ductility of said sheeting.

6. A machine for stretching sheeting comprising means engaging continuous sheeting for moving it lengthwise of itself along a selected path and discharging it at a substantially straight line which extends across said path and which lies in a predetermined plane, means engaging and drawing the sheeting from said discharge line without interrupting said movement of the sheeting for moving it lengthwise of itself along a second selected path, the traces of said selected paths when projected into the plane of the discharge line appearing as straight lines which are angularly disposed to said discharge line in a relation wherein the trace of one of said paths is disposed to said discharge line at angles of other than 90°, and heating means applying heat to the sheeting as it passes between said two sheet-moving means.

7. A machine for stretching continuous sheet material comprising an input section having means for moving the material lengthwise of itself along a selected path and an output section adjacent said input section having means engaging and moving the sheet material discharged from the input section lengthwise of itself along a second selected path whereby to stretch the sheeting, the sheet-moving means in at least one of said sections comprising driven belt means therein gripping opposed surfaces of the sheeting undergoing stretching and moving said sheeting lengthwise of itself, said belt means having two overlying belt surfaces moving in the same direction and pressed towards each other and engaging opposed surfaces of the sheeting therebetween along a substantially straight line extending across said surfaces whereby to apply gripping pressure to said surfaces and move the sheeting in such section in accordance with the movement of said overying belt surfaces of the belt means.

8. A machine for stretching continuous sheet material comprising an input section having means for moving the material lengthwise of itself along a selected path and an output section adjacent said input section having means engaging and moving the sheet material discharged from the input section lengthwise of itself along a second selected path whereby to stretch the sheeting, the sheet-moving means in at least one of said sections comprising driven belt means therein gripping opposed surfaces of the sheeting undergoing stretching and moving said sheeting lengthwise of itself, said belt means having two overlying belt surfaces moving in the same direction and pressed towards each other and engaging opposed surfaces of the sheeting therebetween along a substantially straight line extending across said surfaces whereby to apply gripping pressure to said surfaces and move the sheeting in such section in accordance with the movement of said overlying belt surfaces of the belt means, and speed control means for controlling the rate of movement of said belt means.

9. A machine for stretching continuous sheet material comprising an input section having means for moving the material lengthwise of itself along a selected path and an output section adjacent said input section having means engaging and moving the sheet material discharged from the input section lengthwise of itself along a second selected path whereby to stretch the sheeting, the sheet-moving means in at least one of said sections comprising driven belt means therein gripping opposed surfaces of the sheeting undergoing stretching and moving said sheeting lengthwise of itself, said belt means having two overlying belt surfaces moving in the same direction and pressed towards each other and engaging opposed surfaces of the sheeting therebetween along a substantially straight line extending across said surfaces whereby to apply gripping pressure to said surfaces and move the sheeting in such section in accordance with the movement of said overlying belt surfaces of the belt means, and means for mounting said belt means for selectively varying the direction of the path of movement of said overlying belt surfaces whereby to selectively vary the direction of the path of movement of the sheeting engaged by the belt means.

10. A machine for stretching continuous sheet material comprising an input section having means for moving the material lengthwise of itself along a selected path and an output section adjacent said input section having means engaging and moving the sheet material discharged from the input section lengthwise of itself along a second selected path whereby to stretch the sheeting, the sheet-moving means in at least one of said sections comprising driven belt means therein gripping opposed surfaces of the sheeting undergoing stretching and moving said sheeting lengthwise of itself, said belt means having two overlying belt surfaces moving in the same direction and pressed towards each other and engaging opposed surfaces of the sheeting therebetween along a substantially straight line extending across said surfaces whereby to apply gripping pressure to said surfaces and move the sheeting in such section in accordance with the movement of said overlying belt surfaces of the belt means, speed control means for controlling the rate of movement of said belt means, and means for mounting said belt means for selectively varying the direction of the path of movement of said overlying belt surfaces whereby to selectively vary the direction of the path of movement of the sheeting engaged by the belt means.

11. A machine for forming continuous, composite sheet material having two layers of sheeting laminated together, at least one of said layers comprising stretched sheeting, said machine comprising two supply sources of continuous sheeting, means engaging continuous sheeting from one source of supply and moving it lengthwise of itself along a selected path and discharging it at a substantially straight line which extends across said path and which lies in a predetermined plane, means engaging and drawing the sheeting from said discharge line and moving it lengthwise of itself along a second selected path and stretching the sheeting, the traces of said selected paths when projected into the plane of the discharge line appearing as straight lines which are angularly disposed to said discharge line in a relation wherein the trace of one of said paths is disposed to said discharge line at angles of other than 90°, and driven means which engage said stretched sheeting and which simultaneously engage continuous sheeting from said second source of supply for moving the stretched sheeting and the sheeting from said second source of supply lengthwise of themselves and drawing them into contact with each other and laminating them together.

12. A machine for stretching sheeting comprising means engaging continuous sheeting for moving it lengthwise of itself along a selected path and discharging it at a substantially straight line which extends across said path and which lies in a predetermined plane, and means engaging and drawing the sheeting from said discharge line without interrupting said movement of the sheeting for moving it lengthwise of itself along a second path, the trace of said first-named path when projected into the plane of the discharge line appearing as a straight line which is angularly disposed to said discharge line at angles of other than 90° and the trace of said second-named path when projected into the plane of the discharge line appearing as a straight line which is substantially normal to said discharge line.

13. A machine for stretching sheeting comprising means engaging continuous sheeting for moving it lengthwise of itself along a selected path and discharging it at a substantially straight line which extends across said path and which lies in a predetermined plane, and means engaging and drawing the sheeting from said discharge line without interrupting said movement of the sheeting for moving it lengthwise of itself along a second selected path, the traces of said selected paths when projected into the plane of the discharge line appearing as straight lines which are angularly disposed to said discharge line in a relation wherein both of said traces are disposed thereto at angles of other than 90°.

14. A machine for stretching sheeting comprising means engaging continuous sheeting for moving it lengthwise of itself along a selected path and discharging it at a substantially straight line which extends across said path and which lies in a predetermined plane, and means engaging and drawing the sheeting from said discharge line without interrupting said movement of the sheeting for moving it lengthwise of itself along a second path, the trace of said first-named path when projected into the plane of the discharge line appearing as a straight line which is substantially normal to said discharge line and the trace of the second-named path when projected into the plane of the discharge line appearing as a straight line which is angularly disposed to the discharge line at angles of other than 90°.

15. The method of stretching sheeting comprising moving continuous sheeting lengthwise of itself along a selected path at a selected speed towards a straight line which extends across said path and which lies in a predetermined plane, discharging the sheeting across said line while applying pressure thereto by applying a frictional force to the surfaces of the sheeting in a direction substantially perpendicular to said surfaces along said line, and continuing the lengthwise movement of said sheeting from said discharge line by drawing the sheeting under tension at a second selected speed along a second selected path and against the restraining frictional force applied to the surfaces of the sheeting, the traces of said selected paths when projected into the plane of the discharge line appearing as straight lines which are angularly disposed to said discharge line in a relation wherein the trace of one of said paths is disposed to said discharge line at angles of other than 90°.

16. A method of stretching sheeting comprising moving continuous sheeting lengthwise of itself along a selected path towards a straight line which extends across said path and which lies in a predetermined plane, discharging the sheeting across said line while applying pressure thereto by applying a frictional force to the surfaces of the sheeting in a direction substantially perpendicular to said surfaces along said line, and continuing lengthwise movement of said sheeting without interruption by drawing the sheeting under tension along a second selected path and against the restraining frictional force applied to the surfaces of the sheeting while controlling the rate of movement of the sheeting along said selected paths, the position of said paths being so chosen that traces thereof lying in the plane of the discharge line appear in said plane as straight lines which are angularly disposed to said discharge line in a relation wherein one of said traces is disposed to said discharge line at angles of other than 90°.

17. A method of stretching continuous sheeting comprising the steps of continuously moving the sheeting lengthwise of itself along a path towards a straight line which extends across the path and which lies in a predetermined plane, discharging the sheeting across said line while applying pressure thereto by applying a frictional force to the surfaces of the sheeting in a direction substantially perpendicular to said surfaces along said line, and continuing lengthwise movement of the sheeting by drawing the sheeting under tension along a second path and against the restraining frictional force applied to the surfaces thereof, said method including the steps of controlling the rate of movement of the sheeting along one path with respect to the other path and also controlling the position of said paths within limits such that the traces of the paths lying in the plane of the discharge line appear in said plane as straight lines which are angularly disposed to said discharge line in a relation wherein at least one of said traces is disposed to said discharge line at angles of other than 90°.

18. In a method for stretching continuous sheeting having the property of becoming increasingly ductile when in a heated condition, the steps of moving the sheeting lengthwise of itself along a selected path towards a straight line which extends across said path and which lies in a predetermined plane, discharging the sheeting across said line while applying pressure thereto by applying a frictional force to the surfaces of the sheeting in a direction substantially perpendicular to said surfaces along said line, continuing lengthwise movement of said sheeting without interruption by drawing the sheeting under tension along a second selected path and against the restraining frictional force applied to the surfaces of the sheeting and directing a heated air stream on to each surface of the sheeting as it moves along said second selected path while concentrating said heated air stream over said surfaces at a location substantially along said discharge line, the traces of said selected paths when projected into the plane of the discharge line appearing as straight lines which are angularly disposed to said discharge line in a relation wherein the trace of one of said paths is disposed to said discharge line at angles of other than 90°.

19. In a method for stretching continuous sheeting which is difficultly yieldable when in a cool condition but which becomes relatively ductile on being heated, the steps of moving the sheeting lengthwise of itself along a selected path towards a straight line which extends across said path and which lies in a predetermined plane, discharging the sheeting across said line while applying pressure thereto by applying a frictional force to the surfaces of the sheeting in a direction substantially perpendicular to said surfaces along said line, continuing lengthwise movement of said sheeting without interruption by drawing the sheeting under tension along a second selected path and against the restraining frictional force applied to the surfaces of the sheeting whereby to stretch the sheeting, the traces of said selected paths when projected into the plane of the discharge line appearing as straight lines which are angularly disposed to said discharge line in a relation wherein the trace of one of said paths is disposed to said discharge line at angles of other than 90°, said method including the step of heating said sheeting as it moves from said discharge line along said second path whereby to increase its ductility as it is drawn under tension, and also the step of cooling the heated and stretched sheeting as it moves along said second path after it has been drawn and stretched.

20. A method of stretching continuous sheeting whereby to impart predetermined properties to the sheeting, comprising the steps of moving continuous sheeting lengthwise of itself along a selected path at a selected speed towards a straight line which extends across said path and which lies in a predetermined plane, discharging the sheeting across said line while applying pressure thereto by applying a frictional force to the surfaces of the sheeting in a direction substantially perpendicular to said surfaces along said line, continuing the lengthwise movement of said sheeting from said discharge line by drawing the sheeting under tension at a second selected speed along a second selected path and against the restraining frictional force applied to the surface of the sheeting while applying a second frictional force to the surfaces of the sheeting in a direction substantially perpendicular to said surfaces along a second line across which said sheeting is discharged, the traces of said selected paths when projected into the plane of the first discharge line appearing as straight lines which are angularly disposed thereto in a relation wherein the trace of one of said paths is disposed to said first-named discharge line at angles of other than 90°, and continuing the lengthwise movement of said sheeting from said second discharge line by drawing the sheeting under tension at a third selected speed along at least one other selected path and against the second restraining frictional force applied to the surfaces of the sheeting, the traces of said second and third paths when projected into the plane of the second discharge line appearing as straight lines which are angularly disposed to said second discharge line in a relation wherein the trace of one of said paths is disposed to said second discharge line at angles of other than 90°.

21. The method of treating continuous sheeting formed of stretchable material, comprising continuously causing a pair of opposed and unequal tensional forces to act upon the sheeting to stretch the sheeting while moving the sheeting lengthwise of itself, and applying said tensional forces to said sheeting at spaced apart locations extending across the sheeting to effect stretching of the sheeting in a direction which is at a predetermined acute angle to the longitudinal axis of said sheeting.

22. The method of treating stretchable sheet material comprising gripping the material by the application of a gripping force applied to act across the material, and applying a tensional force to the material which acts thereacross and in opposition to said gripping force to effect the stretching of the material in a direction which is at a predetermined acute angle with respect to the longitudinal axis of the material.

WILLIAM H. RYAN.

REFERENCES CITED

The following references are of record in the file of this patent:

UNITED STATES PATENTS

| Number | Name | Date |
|---|---|---|
| 469,256 | Laval | Feb. 23, 1892 |
| 1,784,758 | Sheppard et al. | Dec. 9, 1930 |
| 2,067,025 | Schmidt | Jan. 5, 1937 |
| 2,305,470 | Gibbs | Dec. 5, 1942 |
| 2,335,190 | Minich | Nov. 23, 1943 |
| 2,412,187 | Wiley et al. | Dec. 3, 1946 |
| 2,448,433 | Irons et al. | Aug. 31, 1948 |